United States Patent
Kurumizawa et al.

(10) Patent No.: US 8,647,135 B2
(45) Date of Patent: Feb. 11, 2014

(54) LOCK DEVICE

(71) Applicant: Kabushiki Kaisha Tokai Rika Denki Seisakusho, Aichi (JP)

(72) Inventors: Naoto Kurumizawa, Aichi (JP); Keiji Kahara, Aichi (JP); Toshiharu Katagiri, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 13/826,364

(22) Filed: Mar. 14, 2013

(65) Prior Publication Data
US 2013/0255333 A1  Oct. 3, 2013

(30) Foreign Application Priority Data
Mar. 29, 2012  (JP) ................... 2012-077050

(51) Int. Cl.
*H01R 13/62* (2006.01)
(52) U.S. Cl.
USPC ........................................................ 439/304
(58) Field of Classification Search
USPC ................................................. 439/304, 133
See application file for complete search history.

(56) References Cited

U.S. PATENT DOCUMENTS

| 8,075,329 B1* | 12/2011 | Janarthanam et al. ........ 439/304 |
| 8,251,734 B2* | 8/2012 | Katagiri et al. ............... 439/352 |
| 8,357,001 B2* | 1/2013 | Katagiri et al. ............... 439/304 |
| 8,523,589 B2* | 9/2013 | Kurumizawa et al. ........ 439/304 |

FOREIGN PATENT DOCUMENTS

JP  2011-243500  12/2011

* cited by examiner

*Primary Examiner* — Phuong Dinh
(74) *Attorney, Agent, or Firm* — Greenblum & Bernstein P.L.C.

(57) ABSTRACT

A lock device locks a lid, which protects the inlet, and a power supplying plug. The lock device includes a helical gear rotated by the motor. A helical gear is connected to a control shaft. The control shaft is moved to a hook lock bar lock position when the helical gear rotates counterclockwise from the reference position. The helical gear is connected by a transmission member to a lid lock bar. The lid lock bar is constantly urged toward a lid lock position by a coil spring. When the helical gear rotates clockwise from the reference position, the lid lock bar moves to the lid unlock position against the urging force of the coil spring.

9 Claims, 14 Drawing Sheets

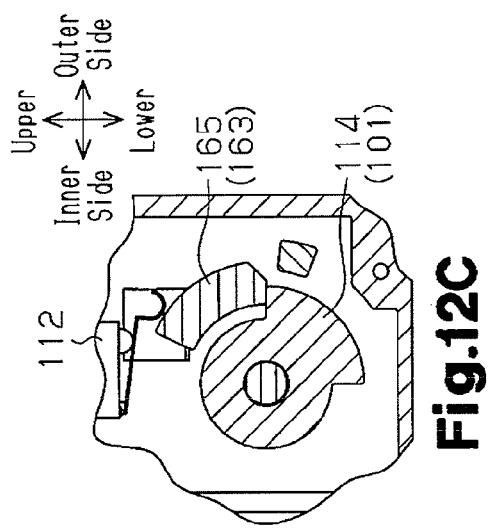
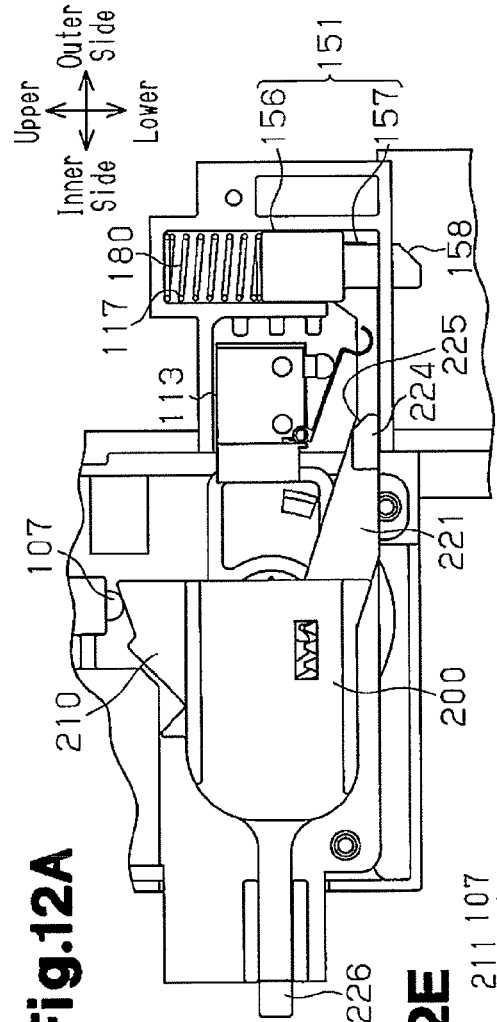
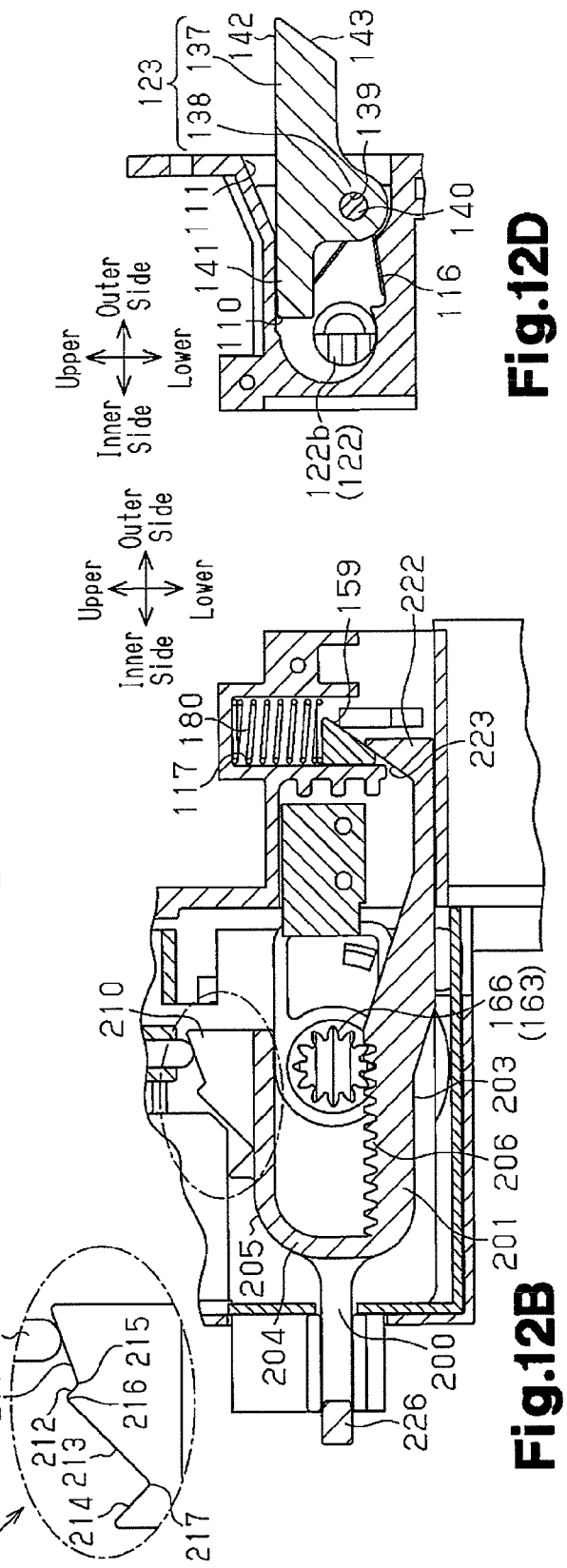

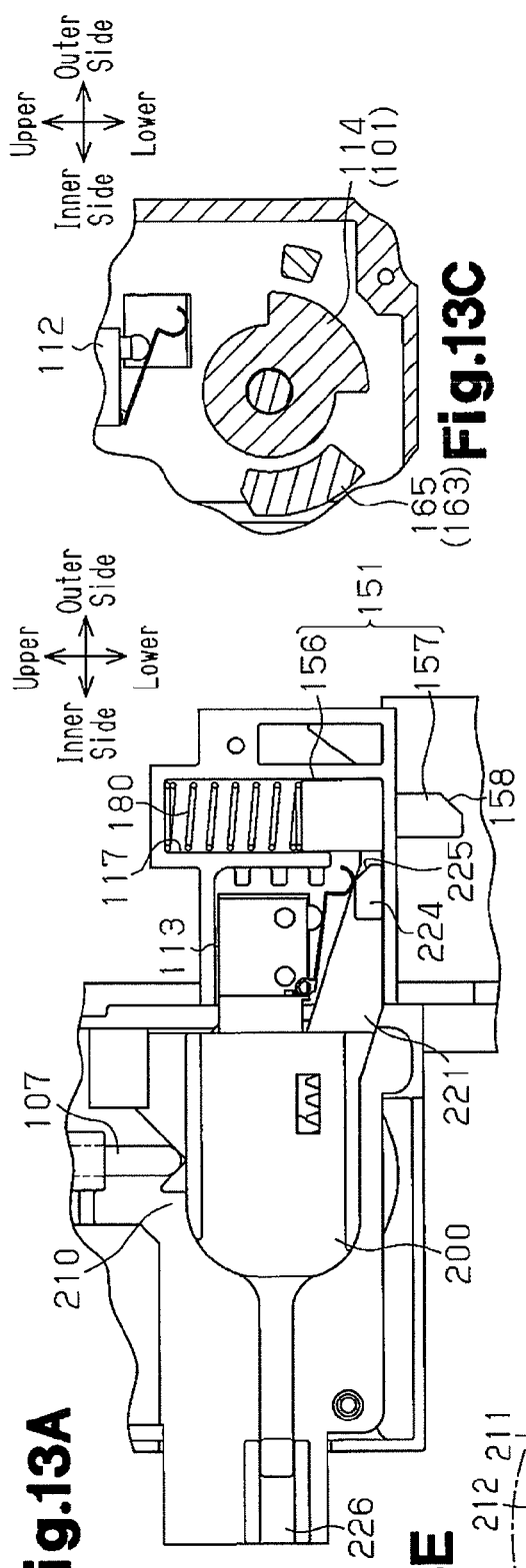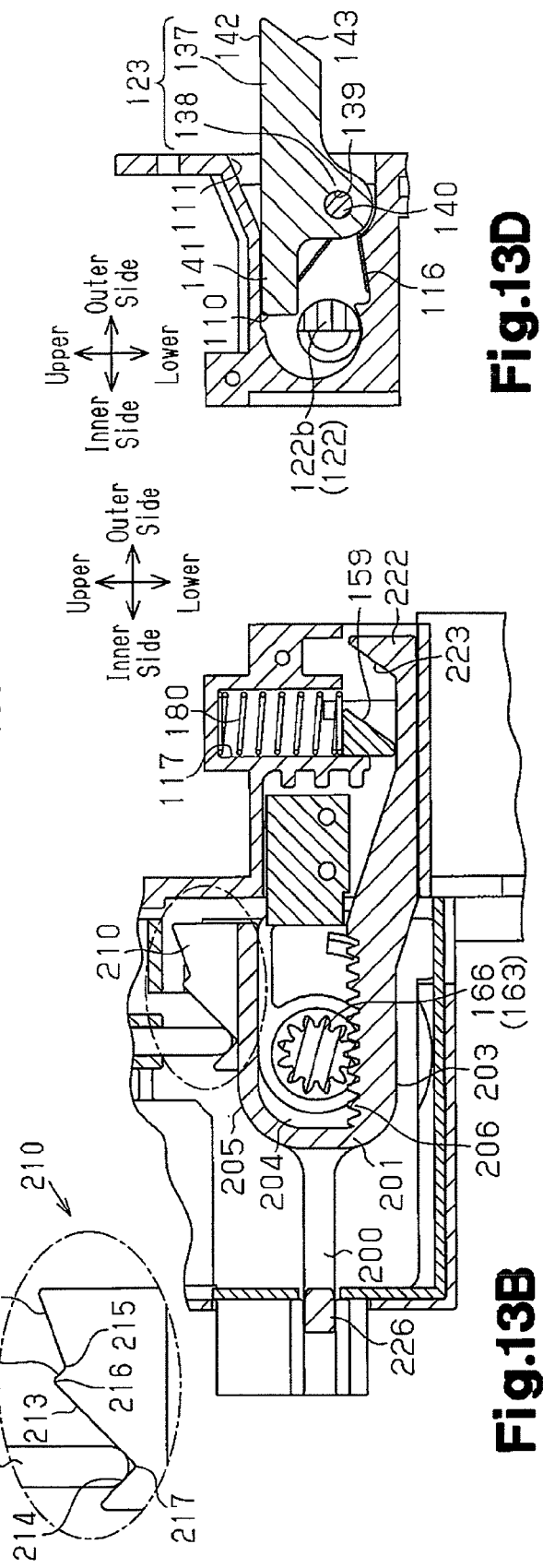

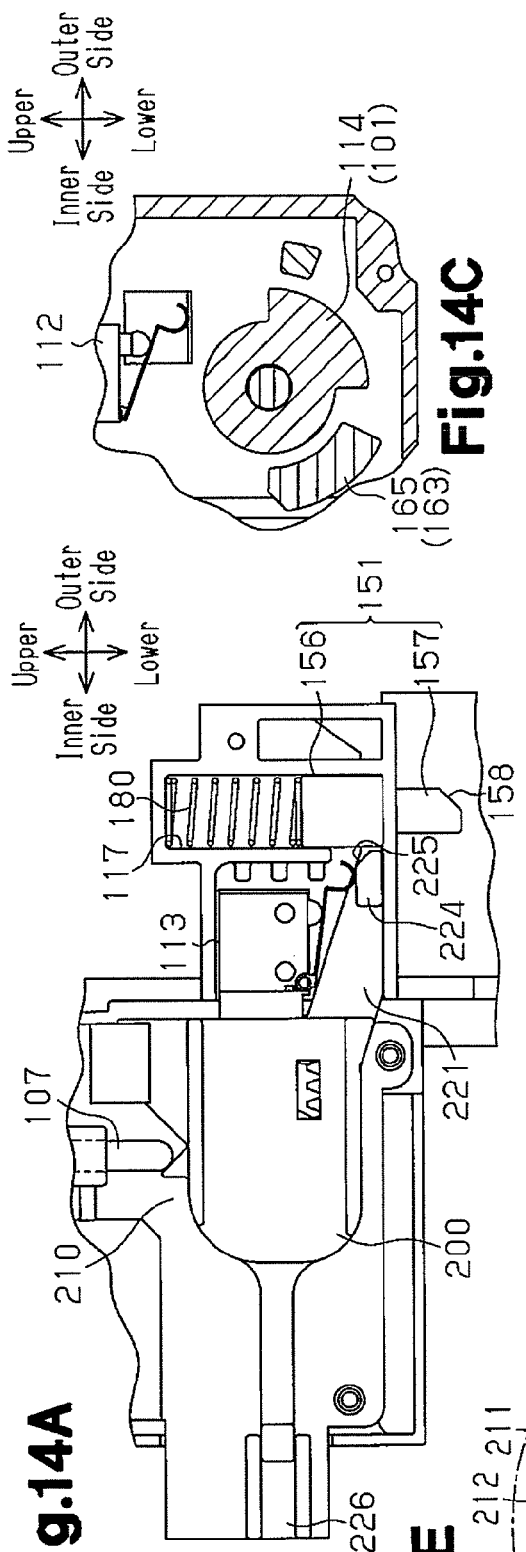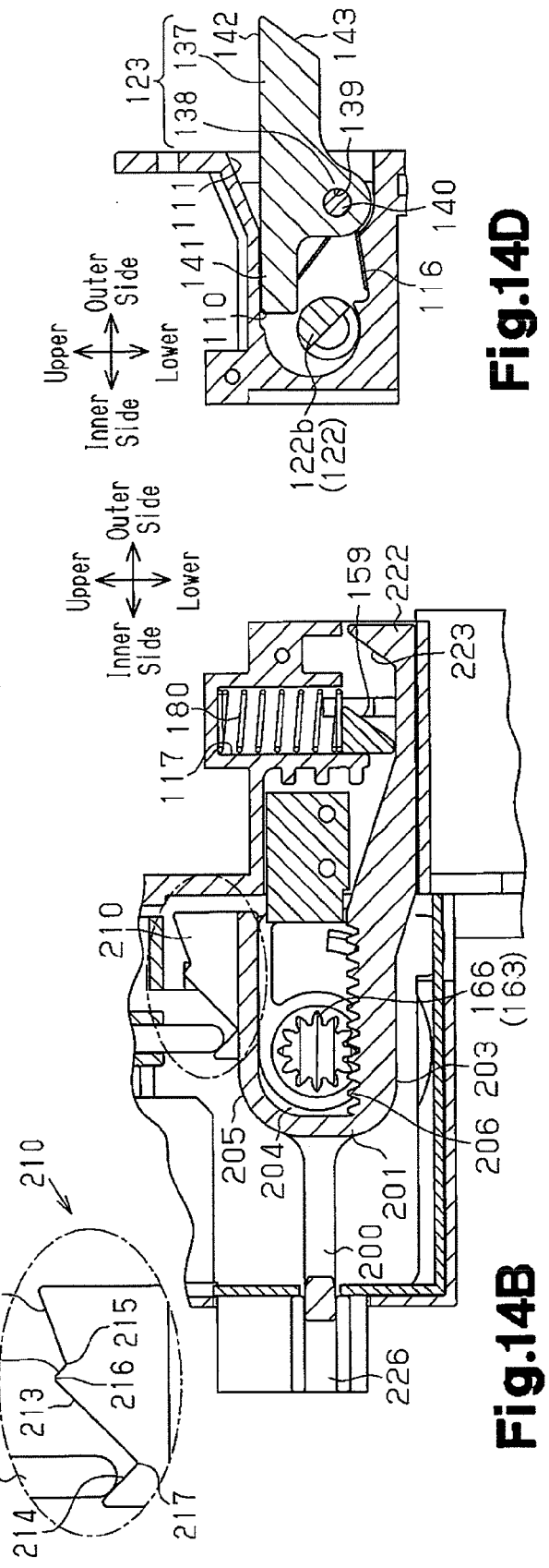

LOCK DEVICE

CROSS-REFERENCE TO RELATED APPLICATIONS

This application is based upon and claims the benefit of priority from prior Japanese Patent Application No. 2012-077050, filed on Mar. 29, 2012, the entire contents of which are incorporated herein by reference.

BACKGROUND ART

The present invention relates to a lock device that restricts removal of a power supplying plug from a power reception connector.

Japanese Laid-Open Patent Publication No. 2011-243500 describes one example of a lock device. The lock device restricts removal of a power supplying plug from a power reception connector (inlet), which is accommodated in an inlet accommodation portion of a vehicle. In addition, the lock device restricts opening of an inlet lid, which closes the inlet accommodation portion, to prevent the power reception connector from being accessed.

The lock device includes a hook lock bar and a lid lock bar. The hook lock bar moves between a hook lock position and a hook unlock position. The lid lock bar moves between a lid lock position and a lid unlock position. When the hook lock bar is located at the hook unlock position, the hook lock bar restricts movement of a hook of the power supplying plug, which is connected to the inlet and engaged with a hook seat of the inlet. When the hook lock bar is located at the hook unlock position, the hook is unlocked and is able to be disengaged from the hook seat. This permits movement of the hook.

When the lid lock bar is located at the lid lock position, the lid lock bar is received in a lid hole of the lid thereby restricting opening of the lid. When the lid lock bar is located at the lid unlock position, the lid lock bar is separated from the lid hole thereby permitting opening of the lid.

The hook lock bar and the lid lock bar are moved in cooperation with the rotation of rotating bodies driven by the same motor. Accordingly, when the motor rotates the rotating bodies, the hook lock bar moves between the hook lock position and the hook unlock position. Simultaneously, the lid lock bar is moved between the lid lock position and the lid unlock position.

When the power supplying plug is connected to the inlet and the hook lock bar is located at the hook lock position, the hook is held on the hook seat. This restricts removal of the power supplying plug from the inlet. When the inlet accommodation portion is closed by the lid and the lid lock bar is located at the lid lock position, the lid lock bar is held in the lid hole. This restricts opening of the lid.

To open the lid, the lock device always drives the motor to move the lock bar to the lid unlock position. When the inlet accommodation portion is closed by the lid, the lock device also drives the motor to move the lid lock bar from the lid unlock position to the lid lock position. In both cases, it takes time for the motor to drive and complete the movement of the lid lock bar. Thus, the lock device is inconvenient.

SUMMARY

It is an object of the present invention to provide a lock device that locks a power supplying plug and a lid with the same drive source and is easy to use.

One aspect of the present invention is a lock device that locks a lid and a power supplying plug. The lid protects a power reception connector. The lock device includes a plug restriction member that moves between a plug lock position and a plug unlock position. The plug restriction member restricts removal of the power supplying plug from the power reception connector at the plug lock position, and the plug restriction member permits removal of the power supplying plug from the power reception connector at the plug unlock position. A lid restriction member that moves between a lid lock position and a lid unlock position. The lid restriction member engages the lid and restricts opening of the lid at the lid lock position. The lid restriction member permits opening of the lid at the lid unlock position. Further, the lid restriction member is constantly urged toward the lid lock position. A drive mechanism includes a drive source and a rotating body. The drive source generates drive force and rotates the rotating body in first and second directions from a reference position. The drive mechanism is directly or indirectly connected to the plug restriction member to move the plug restriction member from the plug unlock position to the plug lock position when the rotating body rotates from the reference position in the first direction. The drive mechanism is directly or indirectly connected to the lid restriction member to move the lid restriction member from the lid lock position to the lid unlock position against an urging force acting on the lid restriction member when the rotating body rotates from the reference position in the second direction. When closing the lid with the lid restriction member held at the lid lock position, the lid restriction member engages the closing lid and moves toward the lid unlock position thereby permitting the lid to close. The lid restriction member is formed to be returned to the lid lock position by the urging force at a timing at which the lid reaches a close position.

One embodiment provides a lock device mounted on a vehicle including a battery, a travel motor powered by the battery, a power reception connector for a power supplying plug that charges the battery, and a lid for closing the power reception connector. The lock device includes a movable stopper pivotally supported by the power reception connector to engage with and disengage from a power supplying plug connected to the power reception connector; a rotating body connected to a drive source and rotated by the drive source in first and second directions from a reference position;

a control shaft coupled to the movable stopper and the rotating body and rotated by the rotating body from a plug unlock position to a plug lock position when the rotating body rotates from the reference position in the first direction, wherein the control shaft is shaped to move the movable stopper to a position at which the movable stopper engages the power supplying plug when the control shaft rotates to the plug lock position; and a lid lock bar coupled to the rotating body and linearly moved by the rotating body from a lid lock position to a lid unlock position against an urging force acting on the lid restriction member when the rotating body rotates from the reference position in the second direction. When the lid is manually operated to close the power reception connector while the lid lock bar is held at the lid lock position, the lid lock bar is urged toward the lid unlock position by the closing lid thereby permitting the lid to close. The lid lock bar is formed to be returned to the lid lock position by the urging force at a timing at which the lid reaches a close position.

The object and advantages of the invention will be realized and attained by means of the elements and combinations of particularly pointed out in the claims. It is to be understood that both the foregoing general description and the following detailed description are exemplary and explanatory and are not restrictive of the invention.

BRIEF DESCRIPTION OF THE DRAWINGS

The invention, together with objects and advantages thereof, may best be understood by reference to the following description of the presently preferred embodiments together with the accompanying drawings in which:

FIG. 12A is a left side view of the lid lock device when the lock device is in a second state;

FIG. 12B is a cross-sectional view showing the helical gear and the transmission member engaged with each other when the lock device is in the second state;

FIG. 12C is a cross-sectional view showing the location of the block when the lock device is in the second state;

FIG. 12D is a cross-sectional view showing the hook lock bar restriction portion and the hook lock bar engaged with each other when the lock device is in the second state;

FIG. 12E is a partially enlarged view of FIG. 12B;

FIG. 13A is a left side view of the lid lock device when the lock device is in a third state;

FIG. 13B is a cross-sectional view showing the helical gear and the transmission member engaged with each other when the lock device is in the third state;

FIG. 13C is a cross-sectional view showing the location of the block when the lock device is in the third state;

FIG. 13D is a cross-sectional view showing the hook lock bar restriction portion and the hook lock bar engaged with each other when the lock device is in the third state;

FIG. 13E is a partially enlarged view of FIG. 13B;

FIG. 14A is a left side view of the lid lock device when the lock device is in a fourth state;

FIG. 14B is a cross-sectional view showing the helical gear and the transmission member engaged with each other when the lock device is in the fourth state;

FIG. 14C is a cross-sectional view showing the location of the block when the lock device is in the fourth state;

FIG. 14D is a cross-sectional view showing the hook lock bar restriction portion and the hook lock bar engaged with each other when the lock device is in the fourth state;

FIG. 14E is a partially enlarged view of FIG. 14B; and

DETAILED DESCRIPTION OF EMBODIMENTS

Figure 6:
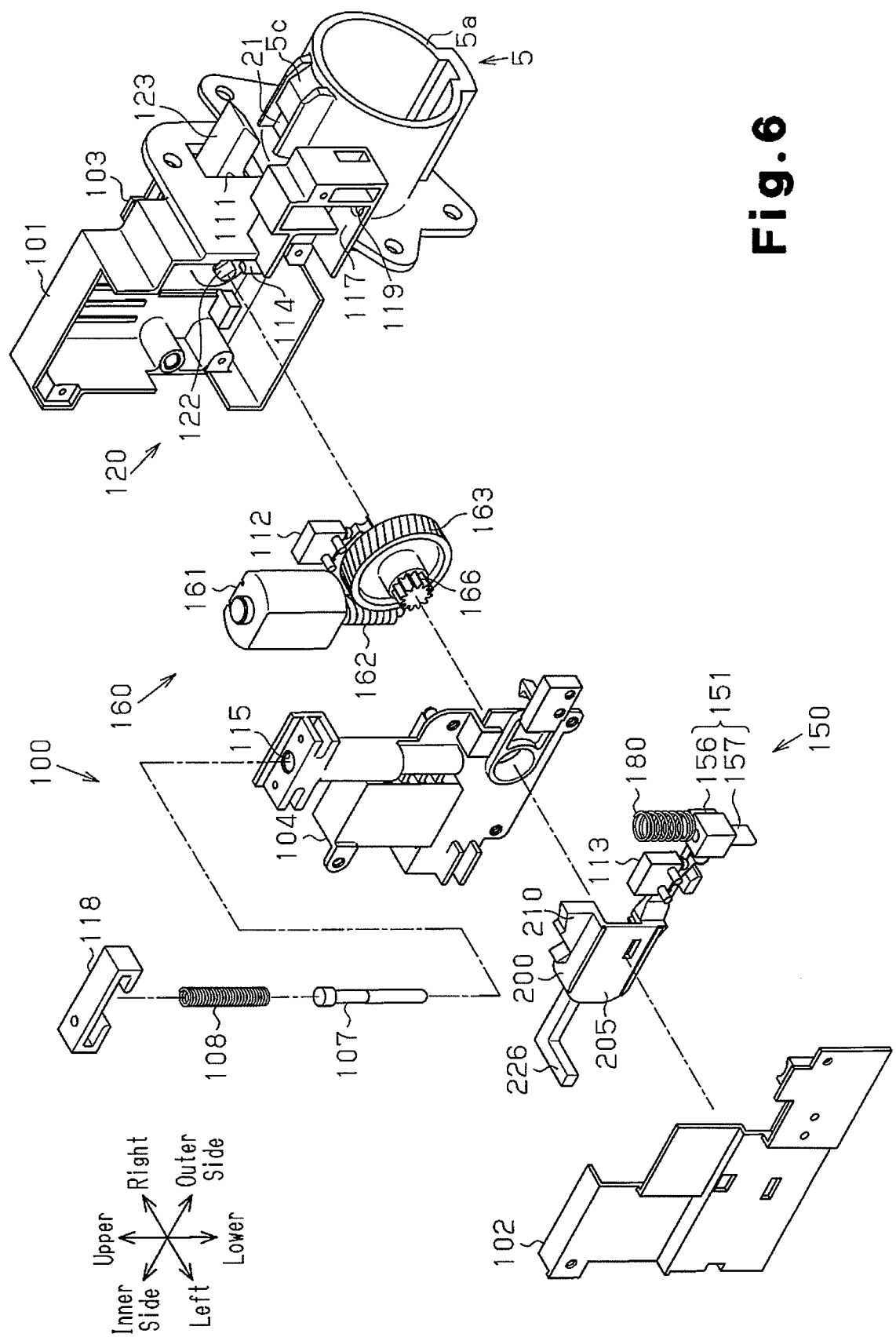
FIGS. 6 and 7 are exploded perspective views of the lock device.
Figure 7:
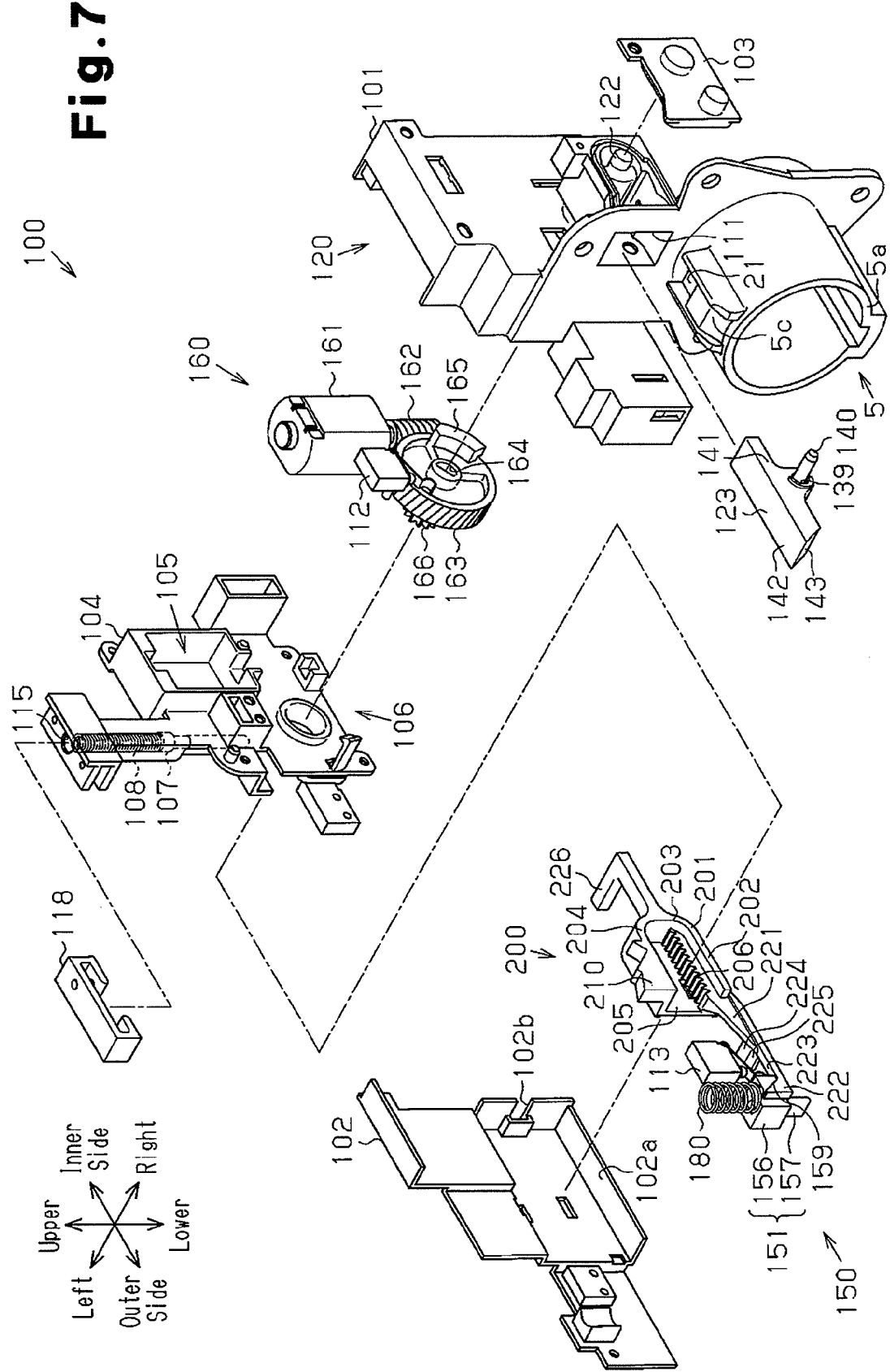

In the description hereafter, to facilitate understanding, directions and positional relationships will be used referring to the coordinate system showing in FIGS. 6 and 7.

Figure 1:
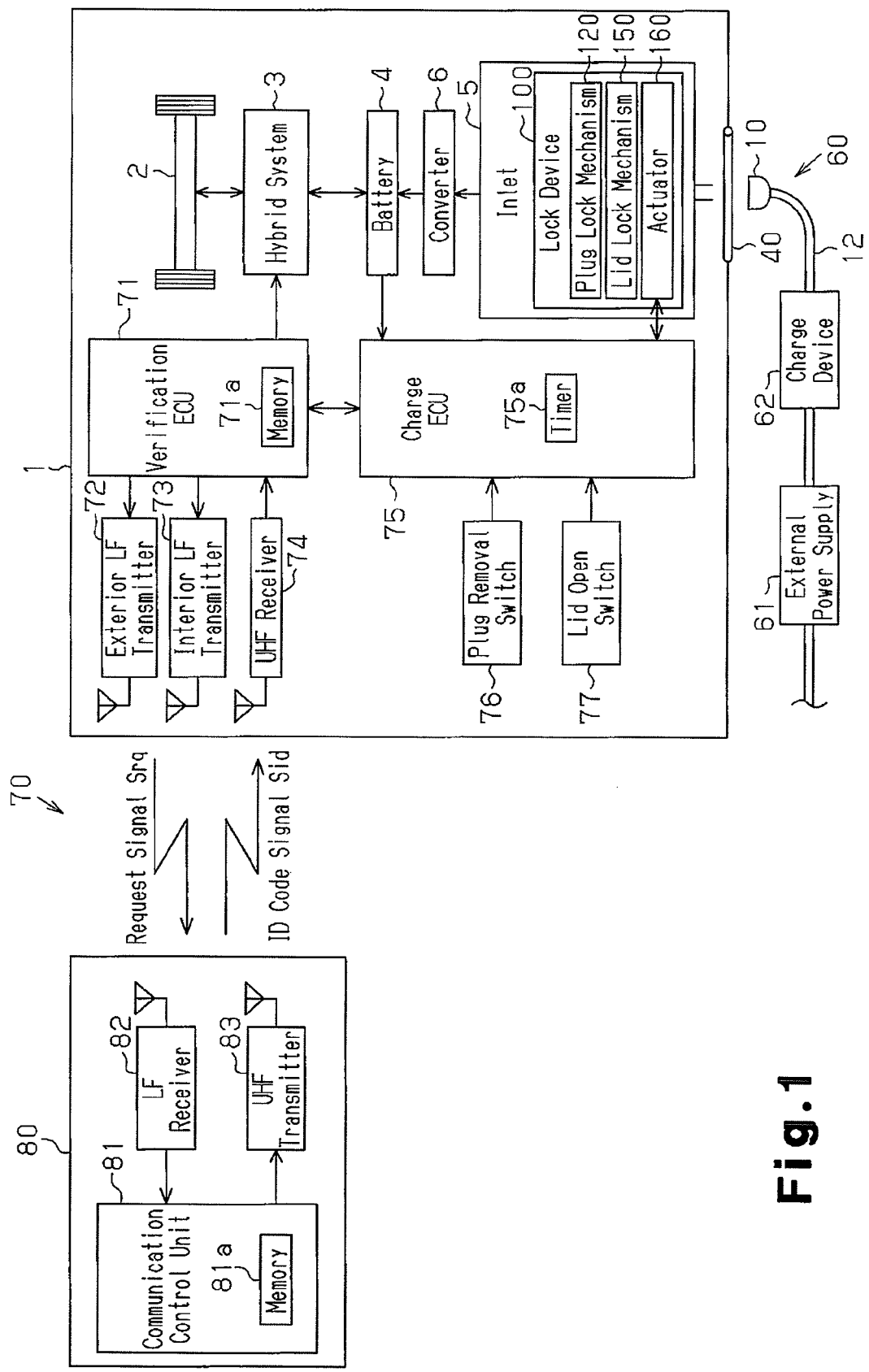
FIG. 1 is a schematic block diagram of a charge system and an electronic key system according to one embodiment of the present invention.

A lock device according to one embodiment of the present invention may be arranged in a vehicle 1, such as a plug-in hybrid vehicle. As shown in FIG. 1, the vehicle includes a hybrid system 3 that combines the drive forces of an engine and a travel motor to rotate drive wheels 2. A battery 4 is connected to the hybrid system 3.

The hybrid system 3 switches traveling modes in accordance with the travel state of the vehicle or the like. The travel modes include a mode for driving the drive wheels 2 with only the power of the engine, a mode for driving the drive wheels 2 with both of the engine and the travel motor, and a mode for driving the drive wheels 2 with only the travel motor. The hybrid system 3 also switches charging modes in accordance with the travel state of the vehicle or the like. The charging modes include a mode for charging the battery 4 with the power of the engine and a mode for charging the battery with the power obtained by converting the braking force of the drive wheels 2 with the travel motor. The vehicle 1 travels and charges the travel motor in accordance with the travel mode and the charge mode switched by the hybrid system.

The battery 4 is connected to an inlet 5 by a converter 6. The inlet 5 functions as a power reception connector that receives a power supplying plug 10, which is connected to an external power supply 61 (AC power supply) by a charge device 62. In the example shown in FIG. 4, the inlet 5 is arranged in an inlet accommodation portion 1a arranged in a side surface of the vehicle 1. The inlet accommodation portion 1a includes an opening 1b that may be closed by a movable lid 40. Referring to FIG. 1, when the power supplying plug 10 is connected to the inlet 5, the charge device 62 transmits a connection signal to the vehicle 1. The converter 6 converts AC voltage, which is supplied from the power supplying plug 10 via the inlet 5, to DC voltage, and supplies the converted DC voltage to the battery 4. In this manner, the battery 4 is charged by the external power supply 61.

The vehicle 1 includes an electronic key system 70 that executes vehicle control allowing, for example, automatic locking and unlocking of vehicle doors without the need for a user to operate a vehicle key. The electronic key system 70 executes the vehicle control through wireless communication performed between the vehicle 1 and an electronic key 80, which serves as an electronic key held by the user.

The electronic key system 70 will now be described. The vehicle 1 includes a verification ECU 71 connected to an exterior low frequency (LF) transmitter 72, an interior LF transmitter 73, and an ultrahigh frequency (UHF) receiver 74. The exterior LF transmitter 72 is arranged in each door of the vehicle 1 and transmits a signal on the LF band. The interior LF transmitter 73 is arranged in the vehicle floor and transmits a wireless signal on the LF band. The UHF receiver 74 is arranged in a rear portion of the vehicle body and transmits a wireless signal on the UHF band. The verification ECU 71 includes a memory 71a, which stores, in advance, a unique ID code corresponding to the electronic key 80.

The electronic key 80 includes a communication control unit 81 connected to an LF receiver 82 and a UHF transmitter 83. The LF receiver 82 receives a signal on the LF band. The UHF transmitter 83 transmits a signal on the UHF band in accordance with a command from the communication control unit 81. The communication control unit 81 includes a memory 81a, which stores, in advance, a unique ID code of the electronic key 80.

The verification ECU 71 intermittently and repeatedly transmits a request signal Srq from the exterior LF transmitter 72 at a controlled timing to form a communication area around the vehicle 1. When the electronic key 80 enters the communication area and the LF receiver 82 receives the request signal Srq, the communication control unit 81 returns an ID code signal Sid in response from the UHF transmitter 83. The ID code signal Sid includes the ID code registered in the memory 81a. When the UHF receiver 74 receives the ID code signal Sid, the verification ECU 71 verifies the ID code of the electronic key 80 with the ID code registered in the memory 71a (exterior verification). When the exterior verification is accomplished, the verification ECU 71 permits or performs the unlocking of the vehicle doors with a door locking device (not shown).

When the vehicle doors are unlocked after the exterior verification is accomplished, the verification ECU 71 transmits the request signal Srq from the interior LF transmitter 73 and forms an interior communication area in the vehicle, preferably in the entire vehicle. When the user who is carrying the electronic key 80 enters the interior communication area and the LF receiver 82 receives the request signal, the communication control unit 81 returns an ID code signal Sid in response from the UHF transmitter 83. The ID code signal Sid includes the ID code registered in the memory 81a. When the UHF receiver 74 receives the ID code signal Sid, the verification ECU 71 verifies the ID code of the electronic key 80 with the ID code registered in the memory 71a (interior verification). When the interior verification is accomplished, the verification ECU 71 permits the hybrid system 3 to start operating.

In one example, the electronic key system 70 further performs ID code verification when charging the battery 4 with the external power supply 61. The vehicle 1 includes a charge ECU 75 that controls charging. The charge ECU 75 is connected by an in-vehicle local area network (LAN) to the verification ECU 71 in a communicable manner. This allows the charge ECU 75 to check the ID verification result of the verification ECU 71. The charge ECU 75 is electrically connected to a plug removal switch 76 and a lid open switch 77, which are arranged in the vehicle. Further, the charge ECU 75 is electrically connected to a lock device 100, which is arranged in the inlet 5. The lock device 100 includes a plug lock mechanism 120, which is switched between a plug lock state and a plug unlock state. In the plug lock state, the plug lock mechanism 120 restricts movement of the power supplying plug 10 in the directions in which the power supplying plug 10 is fitted to and removed from the inlet 5. In the plug unlock state, the plug lock mechanism 120 permits movement of the power supplying plug 10 in the directions in which the power supplying plug 10 is fitted to and removed from the inlet 5. The lock device 100 also includes a lid lock mechanism 150, which is switched between a lid lock state and a lid unlock state. In the lid lock state, the lid lock mechanism 150 restricts movement of the lid 40 in the direction the lid 40 opens. In the lid unlock state, the lid lock mechanism 150 permits such movement of the lid 40. Further, the lock device 100 includes an actuator 160. The actuator 160 switches the plug lock mechanism 120 between the plug lock state and the plug unlock state and switches the lid lock mechanism 150 between the lid lock state and the lid unlock state. The actuator 160 is one example of a drive mechanism.

The charge ECU 75 switches the plug lock mechanism 120 between the plug lock state and the plug unlock state in accordance with the result of an exterior verification performed in response to the operation of the plug removal switch 76. For example, if the plug removal switch 76 is operated when the power supplying plug 10 is disconnected from the inlet 5 and the plug lock mechanism 120 is in the plug lock state, the charge ECU 75 switches the plug lock mechanism 120 to the plug unlock state after determining that the verification ECU 71 has accomplished vehicle exterior verification. This permits connection of the power supplying plug 10 to the inlet 5. When the charge ECU 75 receives a connection signal from the charge device 62 indicating that the power supplying plug 10 has been connected to the inlet 5, the charge ECU 75 controls the converter 6 to start charging the battery 4 with power from the external power supply 61 and switches the plug lock mechanism 120 to the plug lock state. To disconnect the power supplying plug 10 from the inlet 5, the user operates the plug removal switch 76 again. If the plug removal switch 76 is operated, the charge ECU 75 switches the plug lock mechanism 120 to the plug unlock state after determining that the verification ECU 71 has accomplished vehicle exterior verification. This permits disconnection of the power supplying plug 10 from the inlet 5. A person who is not carrying the electronic key 80 is prevented from switching the plug lock mechanism 120 from the lock state to the unlock state. Thus, such a person cannot remove the power supplying plug 10 from the inlet 5 and steal electricity or the power supplying plug 10. In a preferred example, the exterior communication area is formed around the entire vehicle. Thus, when the user who is carrying the electronic key 80 stands by the inlet 5 arranged in, for example, a front side surface of the vehicle, vehicle exterior verification is performed without any problems.

In the preferred example, the charge ECU 75 includes a timer 75a, which is activated when the lid open switch 77 is operated. The timer 75a remains active for a predetermined activation period from when it is activated. During the active period, the timer 75a drives the actuator 160. The active period of the timer 75a is preferably the shortest time required to switch the lid lock mechanism 150 from the lid lock state to the lid unlock state. When the lid open switch 77 is operated, the charge ECU 75 checks the ID verification result of the verification ECU 71 in the same manner as when the plug removal switch 76 is operated. When the ID verification has been accomplished, the charge ECU 75 drives the actuator 160 and switches the lid lock mechanism 150 to the lid unlock state. The structure of the lock device 100 will be described later.

Figure 2:
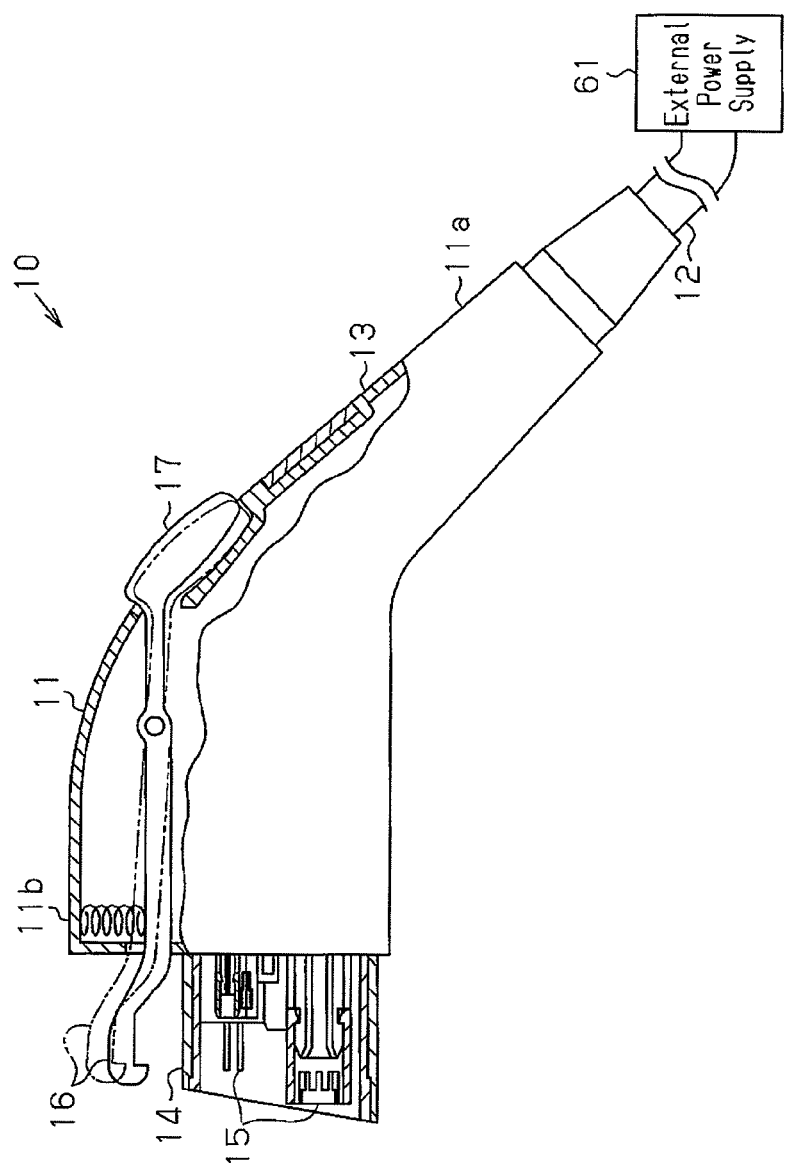
FIG. 2 is a partial cross-sectional view of a power supplying plug.

In the example shown in FIG. 2, the power supplying plug 10 includes a plug body 11 having a basal end 11a connected to a cable 12, which leads to the external power supply 61. The plug body 11 includes a grip 13, which is grasped by the user. The plug body 11 has a distal end 11b that forms a cylindrical power supplying end 14. Connection terminals 15 are arranged in the power supplying end 14. The connection terminals 15 include a power terminal, which forms a power transmission line, and control terminals, which form communication lines for control commands.

A hook 16 is arranged above the power supplying end 14. When the power supplying plug 10 is connected to the inlet 5, the hook 16 is engaged with part of the inlet 5 to keep the power supplying plug 10 and the inlet 5 connected. The plug body 11 pivotally supports the hook 16. The hook 16 is moved between a first position, which is shown by solid lines in FIG. 2, and a second position, which is shown by broken lines in FIG. 2. When the power supplying plug 10 is connected to the inlet 5, the hook 16 is engaged with part of the inlet 5 at the first position and disengaged from the inlet at the second position. Disengagement of the hook 16 from the inlet 5 allows the power supplying plug 10 to be removed from the power supplying plug 10. In the illustrated example, the hook 16 is normally held at the first position in an elastic manner. When a lever 17, which is coupled to the hook 16, is pushed, the hook 16 is moved to the second position (tilted position). When the lever 17 is released, the hook 16 elastically returns to the first position.

Figure 3:
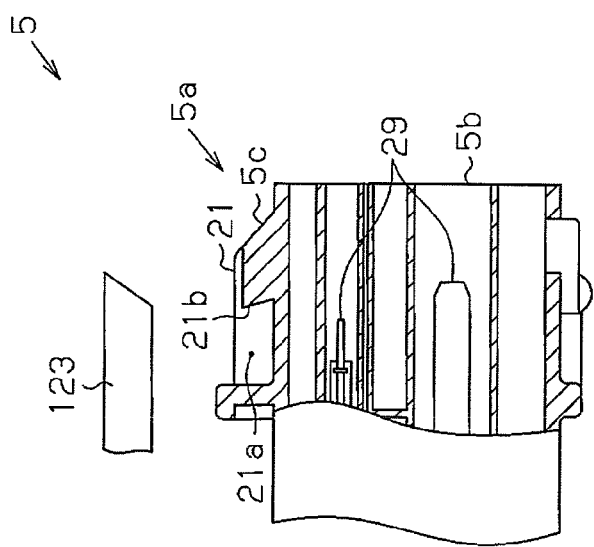
FIG. 3 is a cross-sectional view of an inlet and a lock device.

As shown in FIG. 3, the inlet 5 includes an inlet body 5a. The inlet body 5a of the inlet 5 includes a cylindrical power reception end 5b, which receives the power supplying end 14 of the power supplying plug 10. The power reception end 5b includes connection terminals 29. The connection terminals 29 include a power terminal, which forms a power transmission line, and control terminals, which form communication lines for control commands. When the power supplying plug 10 is connected to the inlet 5, the power terminals of the power reception end 5b and the power supplying end 14 are connected. Further, the control terminals of the power reception end 5b and the power supplying end 14 are connected.

Further, referring to FIG. 3, a hook seat 21, which may be engaged with the hook 16, is formed on the upper peripheral surface of the inlet body 5a. The hook seat 21 includes a slope 5c formed at a distal side (plug side). The hook seat 21 includes a groove, or recess 21a, that receives the hook 16 and allows the hook 16 to tilt. The recess 21a includes an inner surface 21b located at the plug side. Engagement of the hook 16 with the inner surface 21b restricts removal of the power supplying plug 10 from the inlet 5.

Figure 4:
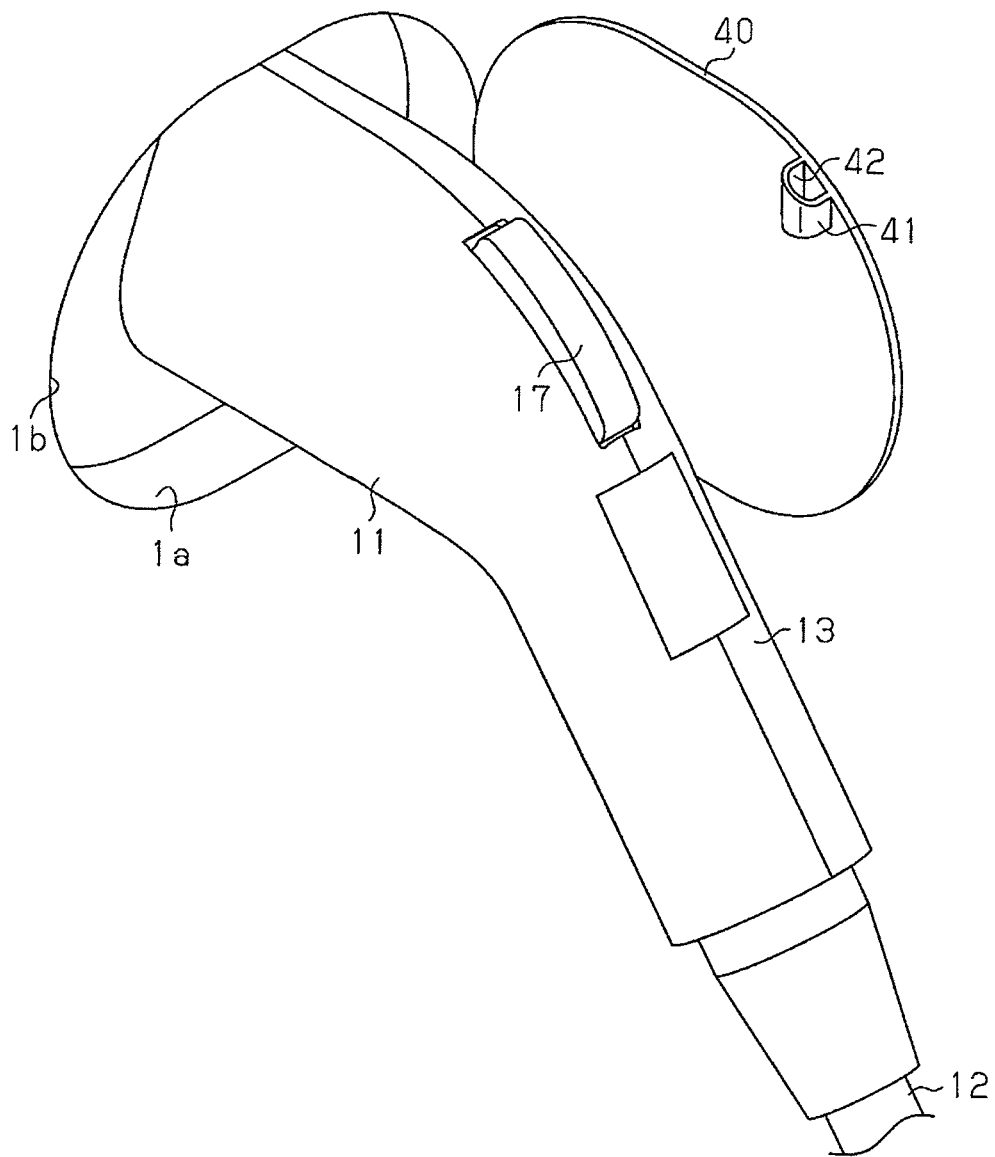
FIG. 4 is a perspective view of an inlet accommodation portion.

Referring to FIG. 4, the inlet accommodation portion 1a is closed by the lid 40, which may be supported by a hinge. The lid 40 includes an outer surface that forms part of the outer surface of the vehicle 1. The lid 40 protects the inlet 5 from the ambient environment. The lid 40 includes a latch hole 42. In the illustrated example, the latch hole 42 is an opening vertically extending through a generally U-shaped plate 41, which is fixed to the inner surface of the lid 40. Preferably, an urging member (not shown) constantly urges the lid 40 in an opening direction.

The lock device 100 will now be described.

Figure 5:
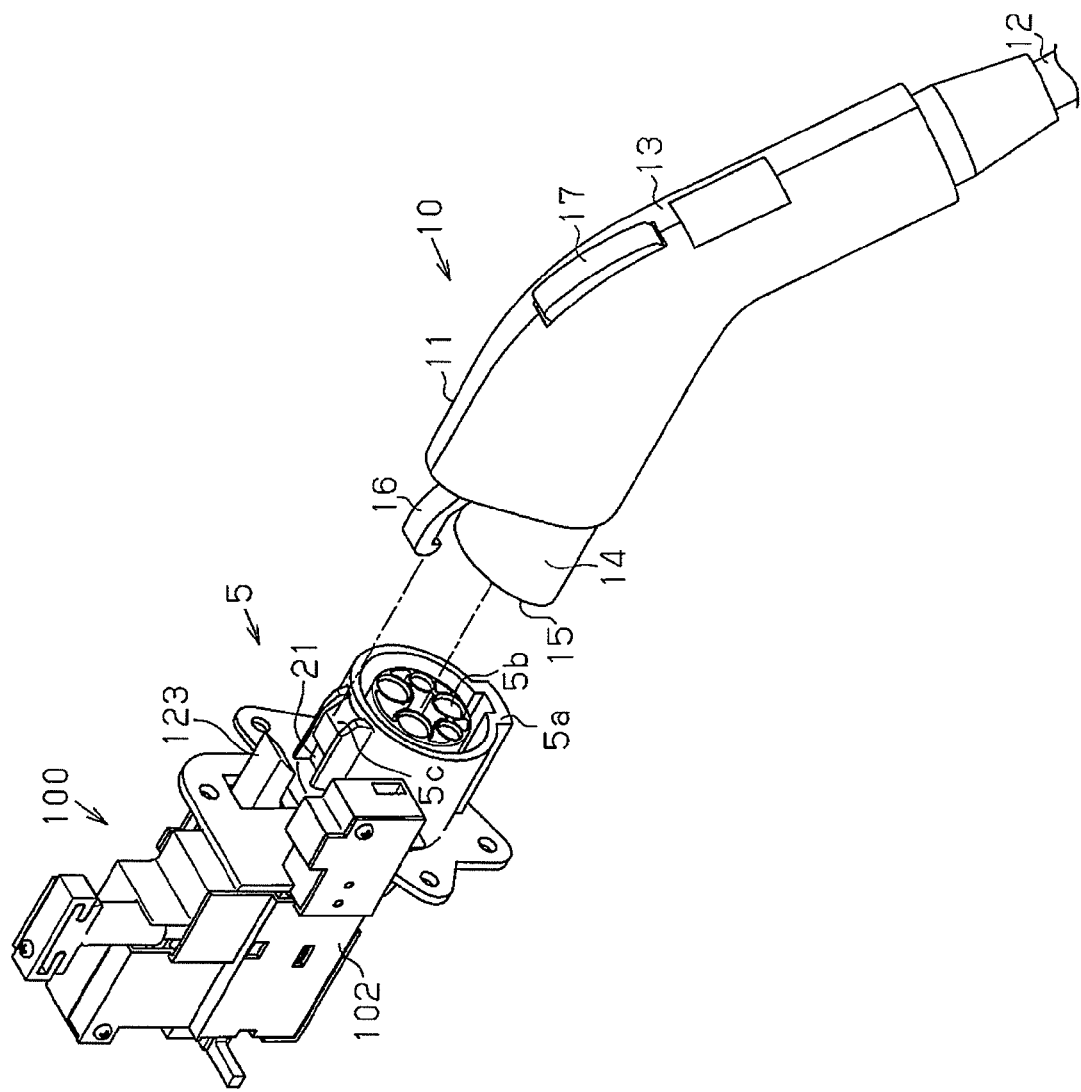
FIG. 5 is a perspective view of the power supplying plug and the inlet.

Referring to FIGS. 5 and 6, the lock device 100 may be accommodated in a case 101, which is a part of the inlet 5 and may be formed integrally with an upper portion of the inlet body 5a. A case cover 102 and an end cover 103 are coupled to the case 101. As shown in FIG. 6, the case cover 102 closes a left opening of the case 101. As shown in FIG. 7, the end cover 103 closes a right opening of the case 101.

The actuator 160 of the lock device 100 will now be described. As shown in FIG. 6, the actuator 160 includes a motor 161 (drive source), a worm gear 162, and a helical gear 163. In the illustrated example, the actuator 160 is arranged between the case 101 and an inner case 104, which is fixed to the left open end of the case 101.

In the example shown in FIG. 7, the inner case 104 includes an upper portion, which functions as a motor accommodation portion 105 that accommodates the motor 161, and a lower portion, which functions as a helical gear accommodation portion 106 that accommodates the helical gear 163.

In the illustrated example, the motor 161 is fixed to the motor accommodation portion 105 so that a motor shaft of the motor 161 extends downward. The worm gear 162 is fixed to the motor shaft and rotates integrally with the motor shaft.

The worm gear 162 is engaged with the helical gear 163. The helical gear 163 includes an axis that preferably extends in the horizontal direction, for example, in the left to right direction as shown in FIG. 7. Rotation of one of the worm gear 162 and the helical gear 163 rotates the other one of the worm gear 162 and the helical gear 163. In the illustrated example, when the motor 161 produces forward rotation, the helical gear 163 is rotated in the clockwise direction as viewed from the left.

Figure 11A:
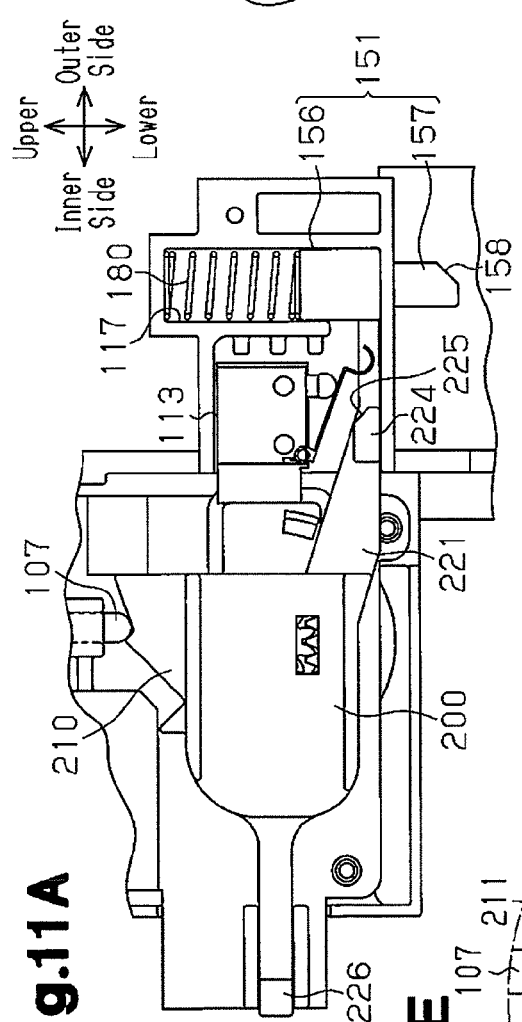
FIG. 11A is a left side view of a lid lock device when the lock device is in a first state.
Figure 11C:
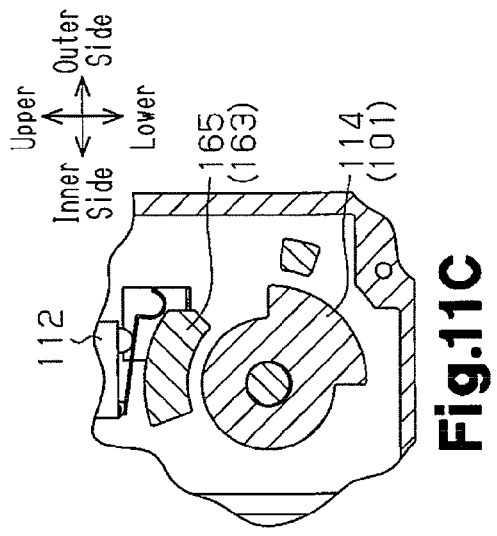
FIG. 11C is a cross-sectional view showing the location of a block when the lock device is in the first state.

Referring to FIG. 7, a semi-cylindrical receptacle 164 extends along the axis of the helical gear 163 from the right side of the helical gear 163. A block 165 projects from the right side of the helical gear 163. The block 165 has a shape obtained by forming a sector bounded by two radii separated by an angle of 60 degrees and then eliminating, from the sector, a further sector bounded by two radii that are one half of the inner diameter of the helical gear 163. The rotation of the helical gear 163 rotates the block 165 about the axis of the helical gear 163. A microswitch 112 is arranged in a rotation path of the block 165. As shown in FIG. 11C, the first microswitch 112 is fixed to the left side of the case 101 and pushed by the block 165 when the block 165 is located at the one o'clock position on a hypothetical circle coaxial with the helical gear 163. The first microswitch 112 is electrically connected to the charge ECU 75 and provides the charge ECU 75 with an electric signal indicating that the first microswitch 112 has been pushed by the block 165. The charge ECU 75 recognizes the rotation state of the helical gear 163 from the electric signal provided from the first microswitch 112. As shown in FIG. 6, a pushing wall 114 projects from the left side of the case 101 along the rotation path of the block 165. As shown in FIG. 11C, the pushing wall 114 has a shape obtained by forming a sector bounded by two radii separated by an angle of 90 degrees and then eliminating, from the sector, a further sector bounded by two radii that are one half of the inner diameter of the helical gear 163. Further, as shown in FIG. 11C, when the pushing wall 114 occupies the region from the three o'clock position to the six o'clock position, the helical gear 163 is allowed to rotate in a range of 210 degrees from a position where one end of the block 165 contacts the end face of the pushing wall 114 at the three o'clock position to a position where the other end of the block 165 contacts the end face of the pushing wall 114 at the six o'clock position.

As shown in FIG. 6, a pinion gear 166 is arranged on the left side of the rotation shaft of the helical gear 163. In the illustrated example, the pinion gear 166 is projected from the left side of the helical gear 163 by a projection amount set to be greater than the thickness of the inner case 104 in the left to right direction. The helical gear 163 is one example of a rotating body.

The plug lock mechanism 120 of the lock device 100 will now be described. As shown in FIGS. 6 and 7, the plug lock mechanism 120 includes a control shaft 122 and a hook lock bar 123. The plug lock mechanism 120 is accommodated in the case 101 at the right side of the pushing wall 114. The control shaft 122 is one example of a plug restriction member. The hook lock bar 123 is one example of a cooperative member. The hook lock bar 123 may be referred to as a movable stopper.

Figure 10:
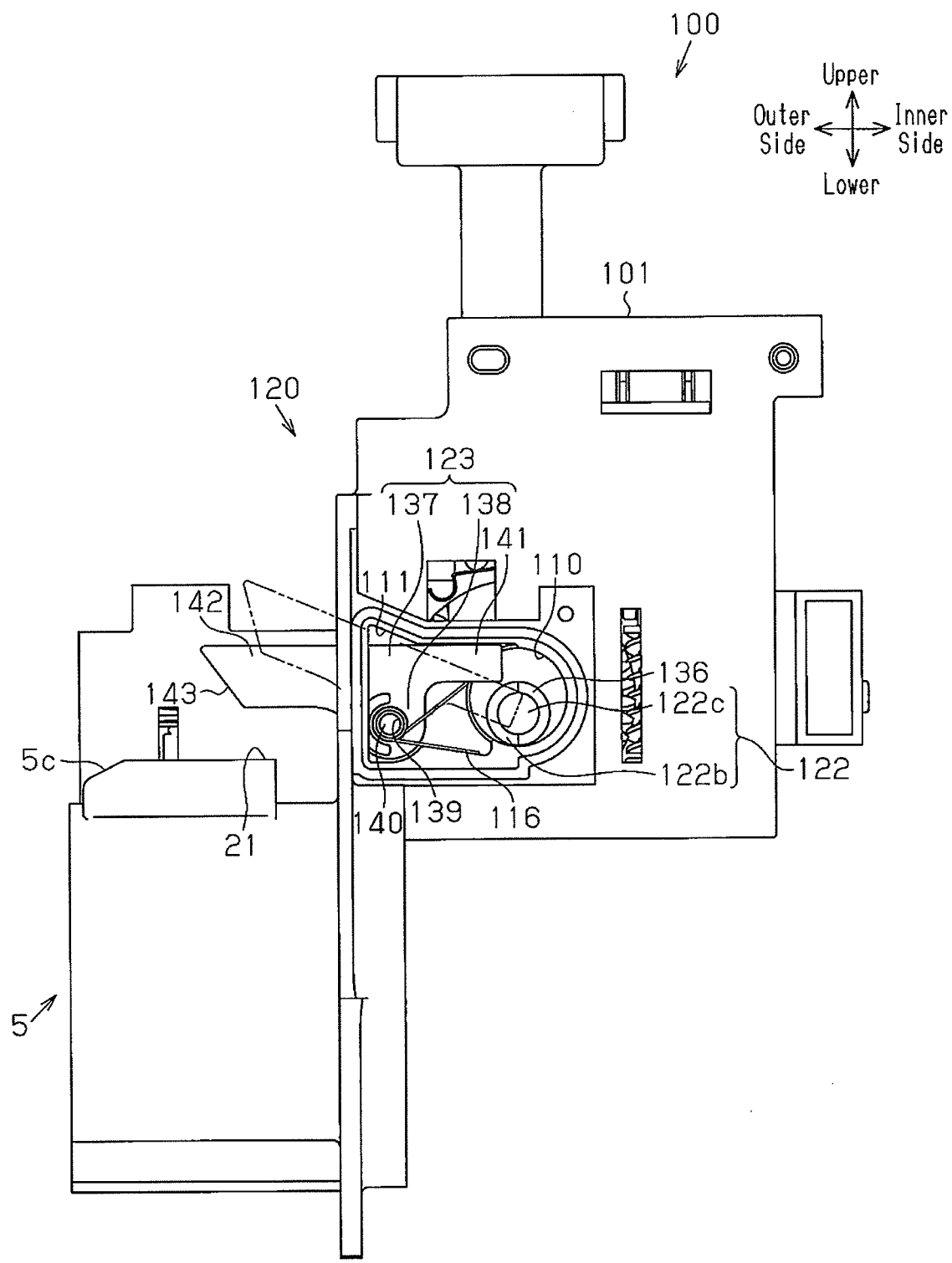
FIG. 10 is a right side view of the lock device.

As shown in FIG. 10, the case 101 includes a control shaft accommodation portion 110 and a hook lock bar accommodation portion 111. The control shaft accommodation portion 110 is formed at the right side of the pushing wall 114 in the case 101. The hook lock bar accommodation portion 111 is formed at the outer side of the control shaft accommodation portion 110. The control shaft accommodation portion 110 is in communication with the helical gear accommodation portion 106. The hook lock bar accommodation portion 111 is in communication with the control shaft accommodation portion 110.

Figure 9A:
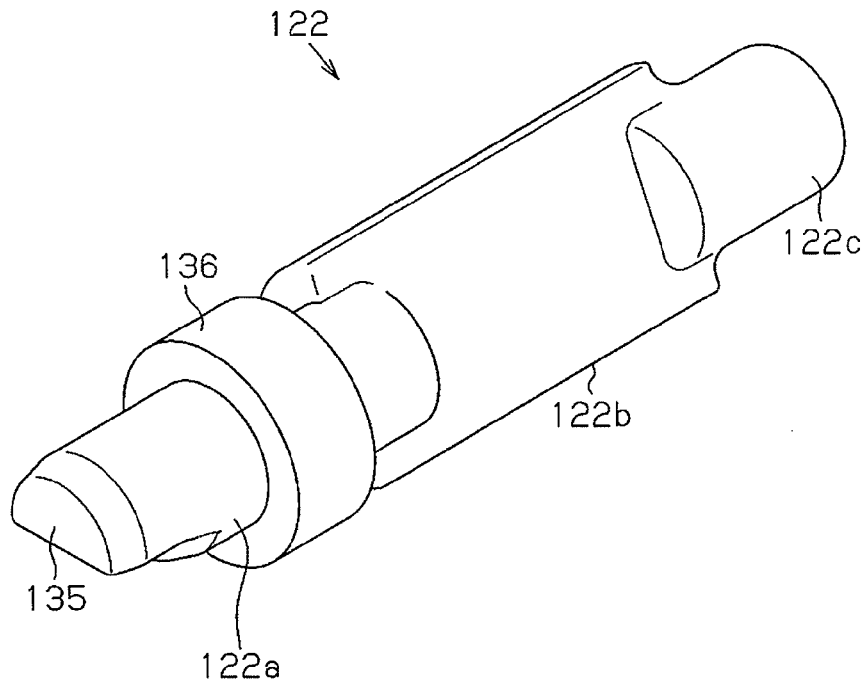
FIGS. 9A and 9B are perspective views of a control shaft.

As shown in FIG. 10, the control shaft accommodation portion 110 may be tubular. As shown in FIG. 9A, the control shaft 122 includes a first shaft portion 122a, a hook lock bar restriction portion 122b, and a second shaft portion 122c.

Figure 9B:
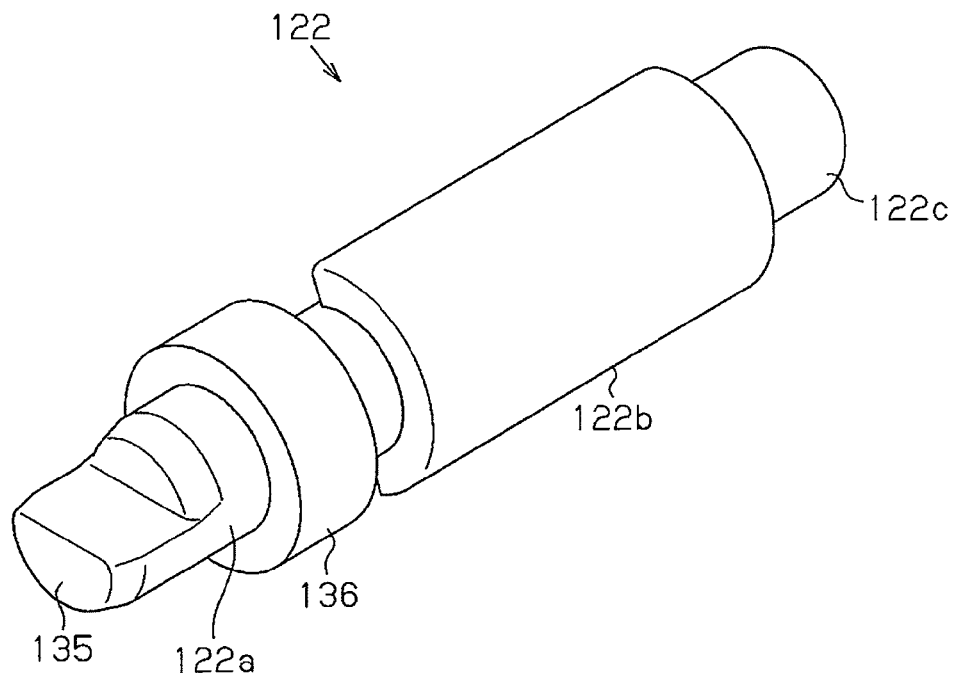

As shown in FIG. 9B, the first shaft portion 122a is cylindrical. A semi-cylindrical end, or coupling portion 135, is formed at the left side of the first shaft portion 122a. The coupling portion 135 has a diameter that is set to be smaller than the diameter of the semi-cylindrical receptacle 164. The coupling portion 135 is fitted into the semi-cylindrical receptacle 164, and the control shaft 122 is rotated integrally with the helical gear 163. In the illustrated example, a ring-shaped lip seal 136 is arranged on the first shaft portion 122a. When the coupling portion 135 is fitted to the semi-cylindrical receptacle 164, the lip seal 136 comes into contact with the helical gear accommodation portion side of the inner wall of the control shaft accommodation portion 110, and hermetically seals the control shaft accommodation portion 110.

Figure 11E:
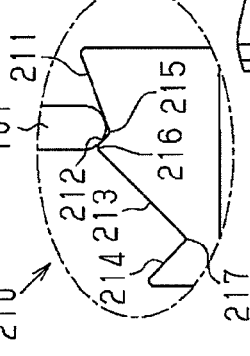
FIG. 11E is a partially enlarged view of FIG. 11B.
Figure 11B:
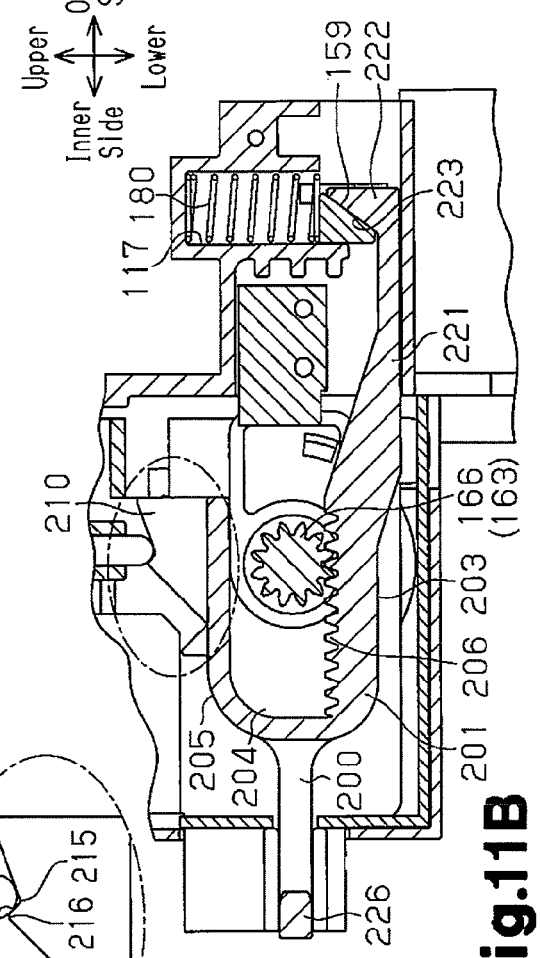
FIG. 11B is a cross-sectional view showing a helical gear and a transmission member engaged with each other when the lock device is in the first state.
Figure 11D:
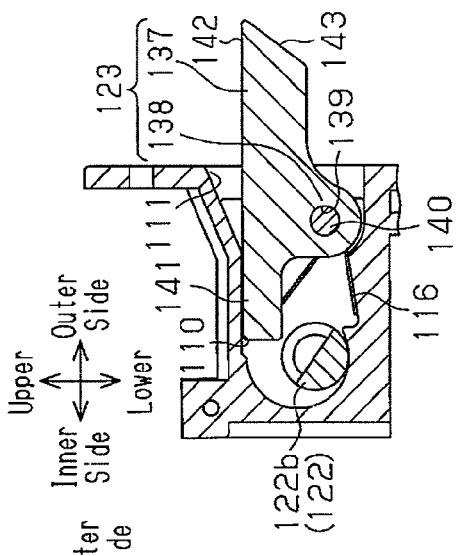
FIG. 11D is a cross-sectional view showing a hook lock bar restriction portion and a hook lock bar engaged with each other when the lock device is in the first state.

As shown in FIGS. 9A and 9B, the hook lock bar restriction portion 122b is semi-cylindrical and arranged at the right side of the first shaft portion 122a. The hook lock bar restriction portion 122b is coaxial with the first shaft portion 122a. Referring to FIG. 11D, the diameter of the hook lock bar restriction portion 122b is smaller than the inner diameter of the control shaft accommodation portion 110. As shown in FIG. 13D, when the hook lock bar restriction portion 122b occupies the region extending clockwise from the twelve o'clock position to the six o'clock position, the hook lock bar restriction portion 122b is located at a hook lock bar unlock position. The hook lock bar restriction portion 122b moves, or rotates, between the hook lock bar lock position and a hook lock bar unlock position.

As shown in FIG. 9A, the second shaft 122c is cylindrical and arranged at the right side of the hook lock bar restriction portion 122b. The second shaft portion 122c is coaxial with the first shaft portion 122a.

As shown in FIG. 7, the hook lock bar accommodation portion 111 is in communication with the control shaft accommodation portion 110 through an opening extending through a relatively outer side of the right wall of the control shaft accommodation portion 110. The hook lock bar accommodation portion 111 has an opening facing the upper side of the hook seat 21.

As shown in FIG. 10, the hook lock bar accommodation portion 111 accommodates the hook lock bar 123, which is T-shaped as viewed from above. The hook lock bar 123 includes a horizontal member 137, which extends from the inner side toward the outer side, and a vertical member 138, which extends downward from a central portion of the horizontal member 137. A through hole 139 extends through the distal end of the vertical member 138 in the left to right direction. A rotation shaft 140 is inserted through the through hole 139. The rotation shaft 140 is rotatably supported by the case 101 and the end cover 103, which closes the right opening of the case 101. The hook lock bar 123 is rotatably supported by the rotation shaft 140.

The inner end of the horizontal member 137 defines a thin portion 141 having a thickness that gradually decreases in the vertical direction toward the inner side, that is, toward the control shaft 122. The thin portion 141 is located between the hook lock bar restriction portion 122b of the control shaft 122 and the upper wall of the control shaft accommodation portion 110. The hook lock bar 123 is movable between a horizontal position and a tilted position. The solid lines in FIG. 10 show the hook lock bar 123 located at the horizontal position in which the upper surface of the thin portion 141 is in contact with the upper wall of the control shaft accommodation portion 110. The broken lines in FIG. 10 show the hook lock bar 123 located at the tilted position in which the lower surface of the thin portion 141 is in contact with the lower wall of the control shaft accommodation portion 110. In the illustrated example, the rotation path of the hook lock bar restriction portion 122b lies along the pivotal path of the thin portion 141 about the rotation shaft 140. FIG. 13D shows the hook lock bar restriction portion 122b located at a hook lock bar lock position in which the hook lock bar restriction portion 122b is arranged in the rotation path of the thin portion 141. When the hook lock bar restriction portion 122b is located at this position, the hook lock bar 123 comes into contact with the hook lock bar restriction portion 122b. Thus, the hook lock bar 123 cannot be moved from the horizontal position to the tilted position.

In the illustrated example, a torsion spring 116 is arranged on the rotation shaft 140. The two ends of the torsion spring 116 are respectively engaged with the lower surface of the thin portion 141 and the lower wall of the control shaft accommodation portion 110. The elastic force of the torsion spring constantly urges the thin portion 141 upward. Thus, the hook lock bar 123 is maintained at the horizontal position in a normal state.

Referring to FIG. 10, the outer end of the horizontal member 137 defines a hook lock 142 that projects above the hook seat 21. The distal end of the hook lock 142 includes a hook guide surface 143 gradually inclined upward toward the outer side. Thus, when the hook lock bar restriction portion 122b is located at the hook lock bar unlock position and, for example, the hook guide surface 143 is pushed by the hook 16 from the outer side to the inner side, the hook lock bar 123 is pivoted toward the right, as viewed in FIG. 10, about the rotation shaft 140 and moved to the tilted position.

The lid lock mechanism 150 of the lock device 100 will now be described. As shown in FIG. 6, the lid lock mechanism 150 includes a lid lock bar 151, which restricts opening of the lid 40, and a transmission member 200, which transmits the rotation of the helical gear 163 to the lid lock bar 151. The lid lock bar 151 is one example of a lid restriction member.

As shown in FIG. 7, the right side of the case cover 102 forms a transmission member accommodation portion 102a, which accommodates the transmission member 200, with the inner case 104. As shown in FIG. 6, the case 101 includes a lid lock bar accommodation portion 117, which accommodates the lid lock bar 151. The lid lock bar accommodation portion 117 is continuous with the outer side of the transmission member accommodation portion 102a. In the illustrated example, the lid lock bar accommodation portion 117 is located above the left side of the inlet 5 as viewed from the outer side.

As shown in FIG. 7, the transmission member 200 includes a U-shaped main body 201. The main body 201 includes a lower plate 202, which extends toward the outer side, a vertical plate 203, which extends upward from the inner end of the lower plate 202, and an upper plate 204, which extends toward the outer side from the upper end of the vertical plate and is opposed to the lower plate 202. In the illustrated example, a wall 205 closes the left ends of the lower plate 202, the vertical plate 203, and the upper plate 204.

A rack 206, which is engaged with the pinion gear 166, is formed on the upper surface of the lower plate 202. As a result, rotation of the helical gear 163, or the pinion gear 166, moves the transmission member 200 in an outer or inner direction. Conversely, movement of the transmission member 200 in the outer direction or the inner direction rotates the helical gear 163.

Figure 8:
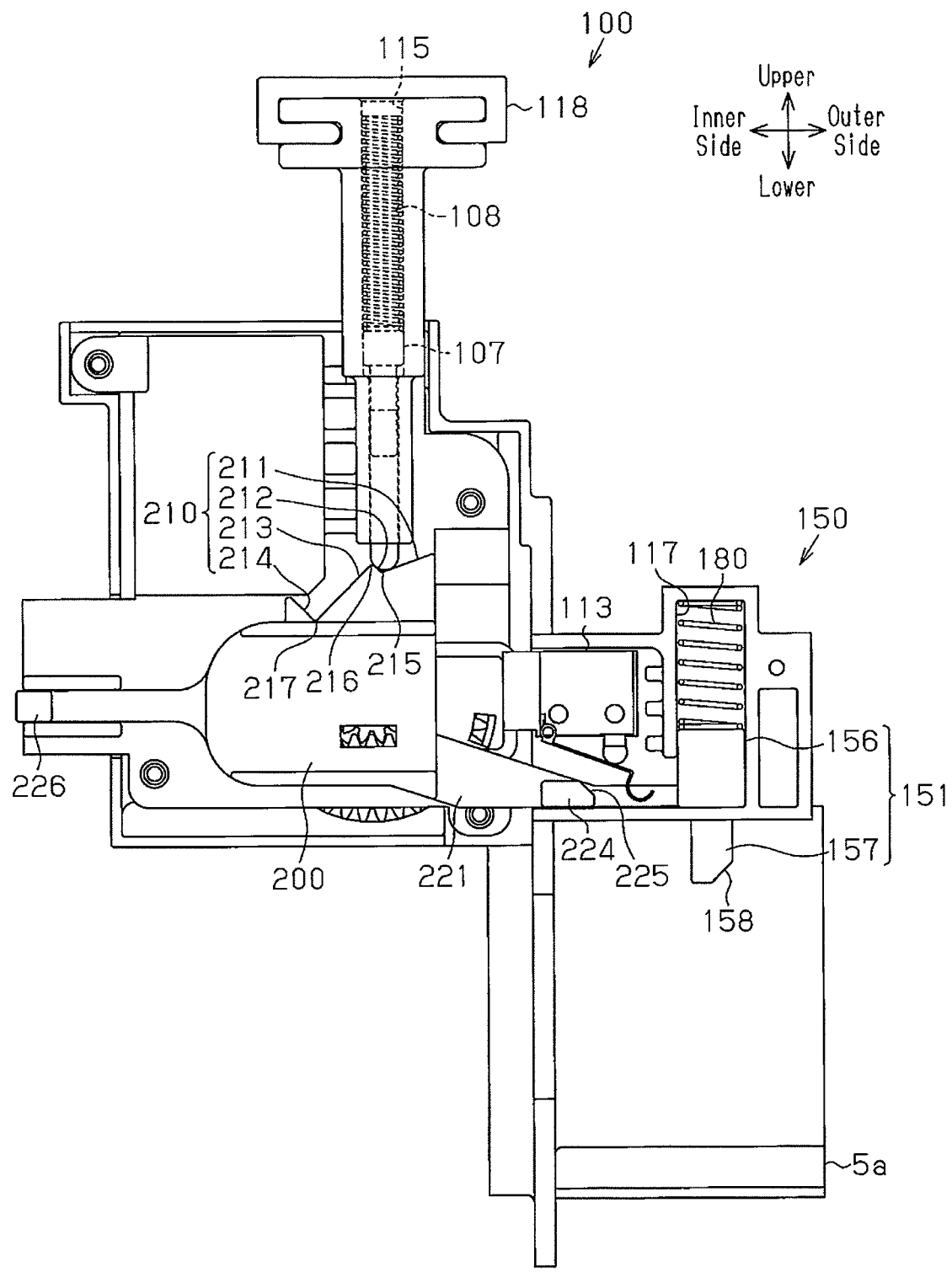
FIG. 8 is a left side view of the lock device.

The upper surface of the upper plate 204 defines a slope portion 210, which includes a plurality of slopes. As shown in FIG. 8, the slope portion 210 includes a first slope 211, a second slope 212, a third slope 213, and a fourth slope 214. The first slope 211 is sloped gradually downward from the outer end of the upper plate 204 toward the inner side. The second slope 212 is continuous with the inner end of the first slope 211 and sloped upward toward the inner side. The third slope 213 is continuous with the inner end of the second slope 212 and sloped downward toward the inner side. The fourth slope 214 is continuous with the inner end of the third slope 213 and sloped upward toward the inner side. In the illustrated example, a first valley 215 is formed between the first slope 211 and the second slope 212. A ridge 216 is formed between the second slope 212 and the third slope 213. A second valley 217 is formed between the third slope 213 and the fourth slope 214. The first valley 215 is located at a higher position than the second valley 217. The ridge 216 is located at a higher position than the first valley 215.

As shown in FIG. 6, the inner case 104 includes a through hole 115, which extends in the vertical direction. When the lock device 100 is assembled, the slope portion 210 is located below the through hole 115. A cover 118 closes the upper end of the through hole 115. The through hole 115 accommodates a cylindrical follower pin 107. The follower pin 107 includes a semispherical lower end. A coil spring 108 is accommodated in the through hole 115 between the upper end of the follower pin 107 and the cover 118. The coil spring 108 constantly urges the follower pin 107 downward. This keeps the lower end of the follower pin 107 in contact with the slope portion 210. More specifically, the follower pin 107 is held in contact with the first valley 215 or the second valley 217 because the follower pin 107 is constantly urged downward. For example, as shown in FIG. 12A, when the follower pin 107 is in contact with the first slope 211, the first slope 211 converts force acting to move the follower pin 107 downward to force acting to outwardly move the transmission member 200. This outwardly moves the transmission member 200. The outward movement of the transmission member 200 engages the follower pin 107 with the first valley 215 and restricts further inward movement of the transmission member 200. In the same manner, when the follower pin 107 is engaged with the second slope 212 or the fourth slope 214, the transmission member 200 is moved toward the inner side. When the follower pin 107 is engaged with the third slope 213, the transmission member 200 is moved toward the outer side.

As shown in FIG. 7, the transmission member 200 includes an extension 221 that outwardly extends from the outer end of the lower plate 202. The extension 221 includes a distal end 222 that defines a first bar moving surface 223, which is upwardly inclined toward the outer side. A projection piece 224 projects from the left side of the extension 221. The projection piece 224 is located inward from the distal end 222. The inner end of the projection piece 224 defines a pushing slope 225, which is gradually sloped downward toward the outer side. In the illustrated example, the transmission member 200 includes a manual operation lever 226, which inwardly extends from the vertically middle portion of the vertical plate 203. The manual operation lever 226 is one example of a manual operation portion.

As shown in FIG. 7, a second microswitch 113, which is fixed to the left side of the inner case 104, is arranged in a movement path of the projection piece 224, which moves when the transmission member 200 moves. Referring to FIG. 13A, when the transmission member 200 is outwardly moved, the second microswitch 113 is engaged with the projection piece 224 and activated. The second microswitch 113 is electrically connected to the charge ECU 75. When pushed by the projection piece 224, the second microswitch 113 outputs an electric signal indicating such pushing to the charge ECU 75. The charge ECU 75 recognizes the position of the transmission member 200 through the electrical signal received from the second microswitch 113.

As shown in FIG. 6, the lower wall of the lid lock bar accommodation portion 117 includes a cylindrical bar insertion hole 119. When the lid 40 is in a closed state, the bar insertion hole 119 is opposed to the latch hole 42.

The lid lock bar 151 includes a box-shaped base portion 156 and a bar portion 157, which is continuous with the lower side of the base portion 156. The length of a diagonal line of the bottom surface of the base portion 156 is set to be greater than the diameter of the bar insertion hole 119. Further, the bar portion 157 has a smaller diameter than the bar insertion hole 119. As shown in FIG. 8, the lid lock bar 151 is accommodated in the lid lock bar accommodation portion 117 with the base portion 156 of the lid lock bar 151 engaged with the lower wall of the lid lock bar accommodation portion 117, and the bar portion 157 projected from the bar insertion hole 119. The distal end of the bar portion 157 defines a bar guide surface 158 gradually inclined downward toward the lower side. The bar guide surface 158 is located in the pivotal path of the U-shaped plate 41 (latch hole 42), which moves when the lid 40 opens and closes the inlet accommodation portion 1a. Thus, referring to FIG. 12A, when the U-shaped plate 41 pushes the bar guide surface 158 from the outer side toward the inner side, the lid lock bar 151 is moved to a lid unlock position in which an upper section of the bar portion 157 is accommodated in the lid lock bar accommodation portion 117. This permits further inward movement of the lid 40.

As shown in FIG. 7, a second bar moving surface 159, which is gradually inclined downward toward the inner side, is formed on the right side of the base portion 156. Thus, inward movement of the transmission member 200 when the first bar moving surface 223 and the second bar moving surface 159 are in contact with each other results in the first and second bar moving surfaces 223 and 159 cooperating with each other to upwardly move the lid lock bar 151. This moves the lid lock bar 151 to the lid unlock position in which an upper section of the bar portion 157 is accommodated in the lid lock bar accommodation portion 117.

As shown in FIG. 8, a coil spring 180 is arranged between the upper surface of the base portion 156 and the upper wall of the lid lock bar accommodation portion 117. The coil spring 180 constantly urges the lid lock bar 151 downward. Accordingly, when the elastic force of the coil spring 180 lowers the lid lock bar 151 from the lid unlock position to a lid lock position, the second bar moving surface 159 is also downwardly moved. During the downward movement of the second bar moving surface 159, when the second bar moving surface 159 is in contact with the first bar moving surface 223, the first and second bar moving surfaces 223 and 159 cooperate with each other to move the transmission member 200 toward the outer side. The outward movement of the transmission member 200 rotates the helical gear 163 in the counterclockwise direction.

As shown in FIG. 7, the inner wall of the case cover 102, which closes the left opening of the case 101, includes a slot 102b, which is slightly larger than the manual operation lever 226. When the case cover 102 is coupled to the case 101, the transmission member 200 may be moved toward the outer side or inner side to rotate the helical gear 163 by operating the manual operation lever 226. Preferably, the manual operation lever 226, which projects from the case cover 102, at a hidden location where it would be unnoticed by a person, such as in the trunk.

The operation of the lock device 100 when charging the battery 4 with the power supplying plug 10 will now be described. The description hereafter will be given under the assumption that the travel drive force of the vehicle 1 is stopped. Here, the transmission member 200 is located where the follower pin 107 is engaged with the first valley 215 as shown in FIGS. 11B and 11E, and the lid lock bar 151 is located at the lid lock position as shown in FIG. 11A. Further, as shown in FIG. 11B, the first bar moving surface 223 is in contact with the second bar moving surface 159. As shown in FIG. 11C, the block 165 is located at the twelve o'clock position (range of eleven o'clock to one o'clock), pushing the first microswitch 112. As shown in FIG. 11D, the hook lock bar restriction portion 122b is located at the hook lock bar unlock position occupying the region extending from the four o'clock position to the ten o'clock position. The hook lock bar 123 is movable to the tilted position. Under this situation, the lock device 100 is in a first state and the lid 40 is in a closed state. Accordingly, the lid 40 is protecting the inlet 5 from the ambient environment, and the power supplying plug 10 cannot be connected to the inlet 5.

When the user pushes the lid open switch 77, the charge ECU 75 receives a signal indicating that the lid open switch 77 has been operated. Then, the charge ECU 75 checks the exterior verification result of the verification ECU 71. After determining that the exterior verification has been accomplished, the charge ECU 75 activates the timer 75a and outputs a drive signal to drive the motor 161 and produce forward rotation during the period the timer 75a is activated. This starts an unlock operation of the lid 40.

When the motor 161 produces forward rotation, the helical gear 163 rotates in the clockwise direction and the lock device 100 shifts to a second state, which is shown in FIGS. 12A to 12D. Referring to FIG. 12B, this moves the transmission member 200 inwardly, and the first bar moving surface 223 lifts the second bar moving surface 159. Referring to FIG. 12A, the transmission member 200 lifts the lid lock bar 151 against the urging force of the coil spring 180. Accordingly, the lid lock bar 151 is arranged at the lid unlock position. This removes the lid lock bar 151 from the latch hole 42. The lid 40 is urged by a biasing means (not shown) in an opening direction. Thus, the removal of the lid lock bar 151 from the latch hole 42 moves the lid 40 in the opening direction. Accordingly, the lid 40 opens the inlet 5.

Referring to FIG. 12C, when the helical gear 163 rotates in the clockwise direction and arranges the block 165 at the two o'clock position (range from one o'clock to three o'clock), the block 165 contacts the pushing wall 114. This restricts further rotation of the helical gear 163 in the clockwise direction. That is, further inner movement of the transmission member 200 is restricted. Thus, the follower pin 107 does not move over the first slope 211. Further, the block 165 continues to push the first microswitch 112.

Referring to FIG. 12D, the hook lock bar restriction portion 122b occupies the region extending clockwise from the six o'clock position to the twelve o'clock position. Under this situation, the hook lock bar restriction portion 122b is located at the hook lock bar unlock position and permits the hook lock bar 123 to move to the tilted position.

Referring to FIG. 12A, when the lid lock bar 151 moves to the lid unlock position, the timer 75a is deactivated. Accordingly, the charge ECU 75 stops the output of the drive signal from the charge ECU 75 to the motor 161. This stops the application of torque in the clockwise direction from the motor 161 to the helical gear 163. Here, as shown in FIGS. 12B and 12E, the distal end of the follower pin 107 is engaged with the first slope 211. The first slope 211 converts the downward urging force of the coil spring 108 applied to the follower pin 107 to a force that moves the transmission member 200 in the outer direction. This moves the transmission member 200 in the outward direction and returns the lock device 100 to the first state, which is shown in FIGS. 11A to 11D. Here, the lid 40 is open. Further, the hook lock bar restriction portion 122b is located at the hook lock bar unlock position. This allows for movement of the hook lock bar 123 to the tilted position, and connection of the power supplying plug 10 to the inlet 5.

Figure 15:
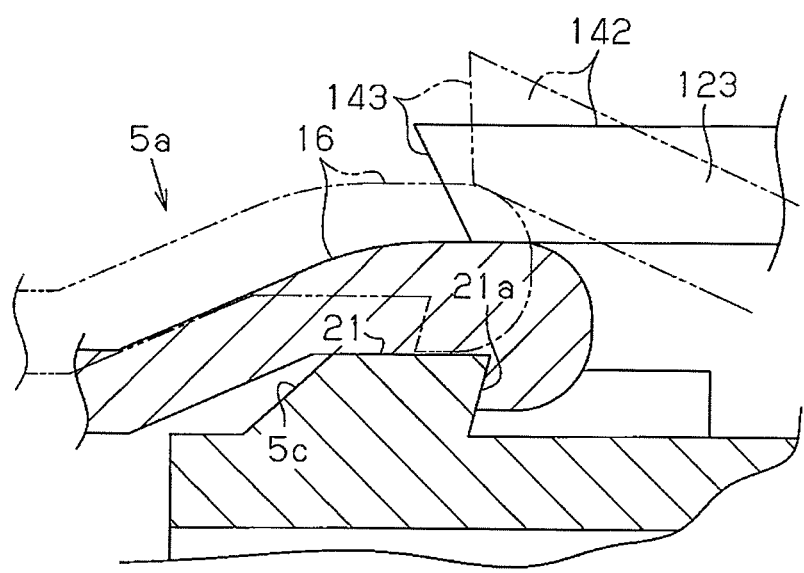
FIG. 15 is a cross-sectional view of the inlet and the power supplying plug in an engaged state and a disengaged state.

Referring to FIG. 5, the power supplying end 14 is aligned with the power reception end 5b, and the hook 16 is engaged with the recess 21a of the hook seat 21. Then, the power supplying plug 10 is moved toward the inlet 5. Referring to FIG. 15, this guides the hook 16 along the slope 5c and moves the hook upward against the elastic force acting to hold the hook at the first position. Further movement of the power supplying plug 10 toward the inlet 5 moves the hook 16 over the slope 5c as shown by the broken lines in FIG. 15 until reaching the recess 21a. The distal portion of the hook 16 pushes the hook guide surface of the hook lock bar 123 and moves the hook lock bar 123 to the tilted position. By further moving the power supplying plug toward the inlet 5, the elastic force acting to hold the hook 16 at the first position moves the hook 16 downward. This engages the hook 16 with the inner surface 21b of the recess 21a, as shown by the solid lines in FIG. 15. Consequently, the connection terminals 15 of the power supplying plug 10 are connected in a preferable manner with the connection terminals 29 of the inlet 5. This electrically connects the power supplying plug 10 and the inlet 5.

When the power supplying plug 10 is connected to the inlet 5, the charge ECU 75 receives a connection signal from the charge device 62. The charge ECU 75 recognizes the connection of the power supplying plug 10 and the inlet 5 when receiving the connection signal. Then, the charge ECU 75 starts charging the battery 4 with power from the external power supply 61, and outputs a drive signal that drives and produces reverse rotation with the motor 161 to move the hook lock bar restriction portion 122b to the hook lock bar lock position. This starts the lock operation of the power supplying plug 10.

When the motor 161 starts producing reverse rotation, the helical gear 163 rotates counterclockwise and shifts the lock device 100 to the third state shown in FIGS. 13A to 13D. Referring to FIG. 13B, when the helical gear 163 rotates counterclockwise, the transmission member 200 moves in the outward direction. Consequently, as shown in FIG. 13A, the projection piece 224 pushes the second microswitch 113. When pushed by the second microswitch 113, the second microswitch 113 sends an electric signal to the charge ECU 75 indicating that it has been pushed. When receiving the electric signal from the second microswitch 113, the charge ECU 75 stops the output of the drive signal to the motor 161. This stops rotating the helical gear 163 in the counterclockwise direction.

In this situation, as shown in FIGS. 13B and 13E, the transmission member 200 is located at a position where the follower pin 107 is engaged with the second valley 217. The engagement keeps the transmission member 200 at this position as long as the helical gear 163 does not rotate.

As shown in FIG. 13D, the rotation of the control shaft 122 moves the hook lock bar restriction portion 122b to the hook lock bar lock position where the hook lock bar restriction portion 122b occupies the region extending clockwise from the 12 o'clock position to the six o'clock position. This restricts movement of the hook lock bar 123 to the tilted position. As long as movement of the hook lock bar 123 to the tilted position is restricted, the hook 16 cannot be disengaged from the recess 21a. Thus, the removal of the power supplying plug 10 from the inlet 5 is restricted.

Referring to FIG. 13C, the block 165 is located at the eight o'clock position (region from seven o'clock position to nine o'clock position). Accordingly, the block 165 does not push the first microswitch 112.

When the second microswitch 113 is pushed, the charge ECU 75 stops the output of the drive signal to the motor 161. However, the motor 161 continues to produce rotation for a slight period of time due to inertia even when the input of the drive signal stops. Thus, the helical gear 163 is rotated in the counterclockwise direction. This shifts the lock device 100 to the fourth state shown in FIGS. 14A to 14D.

In this case, as shown in FIGS. 14B and 14E, the transmission member 200 is located at a position where the follower pin 107 is engaged with the fourth slope 214. The fourth slope 214 converts downward urging force of the coil spring 108 applied to the follower pin 107 to force acting to inwardly move the transmission member 200. This moves the transmission member 200 in the inward direction, and the lock device 100 returns to the third state shown in FIGS. 13A to 13D.

When the lock device 100 is in the fourth state, the projection piece 224 pushes the second microswitch 113 as shown in FIG. 14A. The charge ECU 75 does not send a drive signal to the motor 161. Further, as shown in FIG. 14D, the hook lock bar restriction portion 122b occupies the region extending clockwise from the eleven o'clock position to the five o'clock position, and remains in the hook lock bar lock position. That is, movement of the hook lock bar 123 to the tilted position is continuously restricted.

When the block 165 occupies the region extending counterclockwise from the nine o'clock position to the seven o'clock position, a slight rotation of the block 165 in the counterclockwise direction will result in the block 165 coming into contact with the pushing wall 114, which occupies the region from the three o'clock position to the six o'clock position. This restricts counterclockwise rotation of the helical gear 163. Further outward movement of the transmission member 200 is restricted. Thus, the follower pin 107 does not move over the fourth slope 214.

The operation of the lock device 100 when removing the power supplying plug 10 from the inlet 5 will now be described.

When the plug removal switch 76 is operated and the charge ECU 75 receives a signal indicating that the plug removal switch 76 has been operated, the charge ECU 75 checks the external verification result of the verification ECU 71. After determining that the external verification has been accomplished, the motor 161 outputs a drive signal that drives the motor 161 in the forward direction. This starts the unlock operation of the lid 40. The charge ECU 75 does not activate the timer 75a even though the plug removal switch 76 has been operated.

When the motor 161 is driven to produce forward rotation, the helical gear 163 is rotated clockwise, and the lock device 100 is shifted to the first state shown in FIGS. 11A to 11D. As shown in FIG. 11C, the block 165 moves clockwise and pushes the first microswitch 112. As a result, the first microswitch 112 sends a signal indicating that the first microswitch 112 has been pushed to the charge ECU 75. When the electric signal is received from the first microswitch 112, the charge ECU 75 stops the output of the drive signal to the motor 161. This stops the clockwise rotation of the helical gear 163.

When the first microswitch 112 is pushed, the charge ECU 75 stops the output of the drive signal to the motor 161. However, the motor 161 continues to produce rotation for a slight period of time due to inertia even when the input of the drive signal stops. This rotates the helical gear 163 in the clockwise direction. In this case, the lock device 100 is in the second state shown in FIGS. 12A to 12D. Here, the distal end of the follower pin 107 is engaged with the first slope 211. The first slope 211 converts downward urging force of the coil spring 108 applied to the follower pin 107 to force acting to outwardly move the transmission member 200. This moves the transmission member 200 in the outward direction and returns the lock device 100 to the first state in FIGS. 11A to 11D.

As shown in FIG. 11D, when the lock device 100 is in the first state, the hook lock bar restriction portion 122b is located at the hook lock bar unlock position where it occupies the region extending clockwise from the four o'clock position to the ten o'clock position. This allows the hook lock bar 123 to move to the tilted position. Thus, the hook 16 may be disengaged from the recess 21a, and the power supplying plug 10 may be removed from the inlet 5.

The lid lock bar 151 is located at the lid lock position. After the power supplying plug 10 is removed from the inlet 5, when the user closes the inlet accommodation portion 1a with the lid 40, the U-shaped plate 41 of the lid 40 pushes the bar guide surface 158 of the lid lock bar 151. This moves the lid lock bar 151 to the lid unlock position. When the opening 1b is closed by the lid 40, that is, when the latch hole 42 and the bar insertion hole 119 are opposed to each other, the urging force of the coil spring 180 moves the lid lock bar 151 to the lid lock position. Accordingly, the lid lock bar 151 is inserted into the latch hole 42. This restricts opening of the lid 40.

The lock device 100 includes a manual operation lever 226 of the transmission member 200. The manual operation lever 226 allows for the lock device 100 to be manually operated from outside the lock device 100. The user manually operates the manual operation lever 226 to move the lid lock bar 151 with the transmission member 200 between the lid lock position and the lid unlock position. Further, the manual operation moves the manual operation lever 226 and rotates the helical gear 163 with the transmission member 200. For example, when the motor 161 becomes defective, the user may manually operate the manual operation lever 226 to rotate the helical gear 163 and moves the hook lock bar restriction portion 122b between the hook lock position and the hook unlock position. This avoids a situation in which the power supplying plug 10 cannot be disconnected from the inlet 5.

The present embodiment has the advantages described below.

(1) The coil spring 180 is used to urge the lid lock bar 151 toward the lid lock position. Further, the distal end of the lid lock bar 151 includes the bar guide surface 158, which moves the lid lock bar 151 to the lid unlock position when pushed by the U-shaped plate 41 of the lid 40. Thus, the lid lock bar 151 is moved to the lid lock position and inserted into the latch hole 42 by merely closing the lid 40. This keeps the opening 1b closed by the lid 40. In this manner, the same motor 161 can be used to unlock the lid 40 and lock and unlock the hook 16. The motor 161 does not have to be operated when locking the lid 40, and the lid 40 may be locked just by closing the lid 40. This improves convenience.

(2) The helical gear 163 includes the pinion gear 166, which has an axis on the rotation shaft of the helical gear 163. The pinion gear 166 is engaged with the rack 206 of the transmission member 200, which is linearly movable. Further, the movement of the transmission member 200 arranges the second bar moving surface 159, which is formed on the lid lock bar 151, in the movement path of the first bar moving surface 223, which is formed on the transmission member 200. The engagement of the second bar moving surface 159 with the first bar moving surface 223 converts the force that moves the transmission member 200 to force that moves the lid lock bar 151 to the lid unlock position. As a result, when the rotation of the helical gear 163 moves the transmission member 200, the first bar moving surface 223 comes into contact with the second bar moving surface 159 thereby allowing for the lid lock bar 151 to move to the lid unlock position.

(3) The C-shaped hook lock bar restriction portion 122b is arranged on the control shaft 122, which rotates integrally with the helical gear 163. Further, the hook lock bar restriction portion 122b is located in the movement path of the hook lock bar 123 when the hook lock bar 123 moves to the tilted position. Thus, the helical gear 163 is merely rotated to restrict movement of the hook lock bar 123 to the tilted position with the hook lock bar restriction portion 122b.

(4) The transmission member 200 includes the slope portion 210, which includes the first to fourth slopes 211 to 214. The first slope 211 and the second slope 212 form the first valley 215. The third slope 213 and the fourth slope 214 form the second valley 217. Further, the follower pin 107 is urged toward the slope portion 210. Thus, the follower pin 107 applies urging force to the transmission member 200 through the slope portion 210. The first to fourth slopes 211 to 214 convert the direction of the applied urging force to a direction that moves the transmission member 200 so that the follower pin 107 engages the first valley 215 or the second valley 217. This allows the transmission member 200 to be moved by the urging force from the follower pin 107.

(5) The transmission member 200 includes the manual operation lever 226. The manual operation lever 226 may be operated from outside the lock device 100. The operation of the manual operation lever allows for the movement of the transmission member 200. Further, the helical gear 163 may be rotated by the pinion gear 166, which is engaged with the rack 206 of the transmission member 200. This allows the helical gear 163 to be rotated by operating the manual operation lever 226 even when, for example, the motor 161 becomes defective and the drive force of the motor 161 cannot be used to rotate the helical gear 163. That is, the hook lock bar restriction portion 122b may be moved between the hook lock position and the hook unlock position, and the lid lock bar 151 may be moved between the lid lock position and the lid unlock position. This avoids a situation in which the power supplying plug 10 cannot be disconnected from the inlet 5.

The above embodiment may be modified as described below.

The rack 206 may be arranged at a location other than the upper surface of the lower plate 202. For example, the rack 206 may be arranged on the lower surface of the lower plate 202, the lower surface of the upper plate 204, and the like. This obtains the same advantages as the above embodiment.

The pushing wall 114 may be omitted. In this case, for example, vertical walls that prevent the follower pin 107 from moving over them are arranged on the slope portion 210, more specifically, on the end of the first slope 211 and the end of the fourth slope 214. This structure obtains the same advantages as the above embodiment.

The slope portion 210 may be omitted. In this case, advantages (1) to (3) of the above embodiment may be obtained.

The first bar moving surface 223 and the second bar moving surface 159 may both be slopes. However, one moving surface may be a slope, and the other moving surface may be a surface other than a slope such as a curved surface. In this case, the lid lock bar 151 may be moved between the lid lock position and the lid unlock position.

The manual operation lever 226 does not have to be arranged on the transmission member 200. For example, the manual operation lever 226 may be engaged with a motor shaft of the motor 161 to directly rotate the motor shaft. This obtains the same advantages as the above embodiment.

The worm gear 162 may be omitted. In this case, the helical gear 163 is fixed to the motor shaft of the motor 161. This obtains the same advantages as the above embodiment. In this structure, there is no need for the helical gear 163 to be a gear.

It is preferable that a lid restriction member like the lid lock bar 151 be urged by an urging member like the coil spring 180. In such a structure, the lid restriction member is urged toward the lid lock position. However, the coil spring 180 may be omitted as long as the lid lock bar 151 is constantly urged by its own weight toward the lid lock position.

In the above embodiment, the repulsion force of magnets may be used in lieu of the coil springs 108 and 180.

In the above embodiment, the helical gear 163 and the control shaft 122 are engaged with each other by fitting a semi-cylindrical shaft into a semi-cylindrical recess (hole). Instead, a polygonal shaft may be inserted to a recess shaped in conformance with the polygonal shaft. Further, the shaft and the recess may be fixed to each other by an adhesive agent or the like. In these structures, the helical gear 163 and the control shaft 122 are rotated integrally with each other.

Preferably, the lid 40 is urged by an urging member (not shown) in a direction that opens the opening 1b. However, the urging member may be omitted.

The inlet 5 of the vehicle 1 is not limited to the side surface of the vehicle 1. For example, the inlet 5 may be arranged in a front surface of the vehicle.

In the above embodiment, the hook 16 is arranged above the power supplying end 14. The hook 16 may be arranged at a plurality of locations on the power supplying end 14, such as on the upper and lower portions of the power supplying end 14.

In the above embodiment, the hook 16 is formed on the power supplying plug 10, and the hook seat 21 is arranged on the inlet 5. This may be reversed.

In the above embodiment, the motor 161 is used as the driving means. However, another driving means such as a rotary solenoid may be used.

In the above embodiment, key authentication is performed through the ID verification of the electronic key 80. Instead, key authentication may be performed through mechanical verification of a mechanical key.

In the above embodiment, the electronic key system 70 may employ an immobilizer system that uses a transponder to transmit the ID code.

In the above embodiment, the frequency used by the electronic key system 70 is not necessarily limited to LF and UHF and other frequencies may be used. Further, the frequency for transmitting radio waves to the electronic key 80 from the vehicle and the frequency for returning radio waves to the vehicle 1 from the electronic key 80 do not necessarily have to be different and may be the same.

In the above embodiment, user authentication is not necessarily limited to the key verification that uses the electronic key 80. For example, a different verification such as biometric verification may be performed.

The above embodiment is applied to the inlet 5 of the plug-in hybrid vehicle 1. Instead, the above embodiment may be applied to the inlet of an electric vehicle.

In the above embodiment, the lock device 100 of the present example is not necessarily applied to only the vehicle 1. The lock device 100 may be applied to any apparatus or appliance that includes a rechargeable battery.

Preferably, the actuator 160 is directly connected to the control shaft 122. However, the actuator 160 may be indirectly connected through another member to the control shaft 122. In the illustrated example, the actuator 160 is connected by the transmission member 200 to the lid lock bar 151. However, when, for example, the actuator 160 converts the rotation of the motor 161 to linear motion, the actuator 160 may be directly connected to the lid lock bar 151.

The above modifications may be combined with each other or with the preferred embodiment.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:

1. A lock device that locks a lid and a power supplying plug, wherein the lid protects a power reception connector, the lock device comprising:
    a plug restriction member that moves between a plug lock position and a plug unlock position, wherein the plug restriction member restricts removal of the power supplying plug from the power reception connector at the plug lock position, and the plug restriction member permits removal of the power supplying plug from the power reception connector at the plug unlock position;
    a lid restriction member that moves between a lid lock position and a lid unlock position, wherein the lid restriction member engages the lid and restricts opening of the lid at the lid lock position, the lid restriction member permits opening of the lid at the lid unlock position, and the lid restriction member is constantly urged toward the lid lock position; and
    a drive mechanism including a drive source and a rotating body, wherein the drive source generates drive force and rotates the rotating body in first and second directions from a reference position,
    wherein the drive mechanism is directly or indirectly connected to the plug restriction member to move the plug restriction member from the plug unlock position to the plug lock position when the rotating body rotates from the reference position in the first direction,
    the drive mechanism is directly or indirectly connected to the lid restriction member to move the lid restriction member from the lid lock position to the lid unlock position against an urging force acting on the lid restriction member when the rotating body rotates from the reference position in the second direction,
    when closing the lid with the lid restriction member held at the lid lock position, the lid restriction member engages the closing lid and moves toward the lid unlock position thereby permitting the lid to close, and
    the lid restriction member is formed to be returned to the lid lock position by the urging force at a timing at which the lid reaches a close position.

2. The lock device according to claim 1, further comprising a transmission member connected to the rotating body and the lid restriction member and formed to generate linear motion when the rotating body rotates, wherein
    the lid restriction member is located in a movement path of the transmission member, and
    the lid restriction member is moved by the linear motion of the transmission member between the plug lock position and the plug unlock position.

3. The lock device according to claim 1, wherein
    the power supplying plug includes a movable hook,
    the power reception connector includes a cooperative member that moves in cooperation with the hook and a hook seat, which engages the hook, and
    the plug restriction member rotates integrally with the rotating body in a range between the plug lock position, which is located on a movement path of the cooperative member, and the plug unlock position, which is separated from the movement path of the cooperative member.

4. The lock device according to claim 2, wherein
    the transmission member includes a first valley formed by a first slope and a second slope that are inclined relative to a movement direction of the transmission member, and
    the lock device includes a follower pin that pushes the first valley in a direction perpendicular to the movement direction of the transmission member.

5. The lock device according to claim 4, wherein
    the transmission member includes a second valley and a ridge,
    the second valley is formed by a third slope and a fourth slope that are inclined relative to the movement direction of the transmission member, and
    the ridge is formed by the second slope and the third slope.

6. The lock device according to claim 1, further comprising a manual operation portion manually operated to rotate the rotating body from outside the lock device.

7. The lock device according to claim 1, wherein when the lid restriction member is pushed by the lid at the lid lock position as the lid closes, the lid restriction member temporarily moves from the lid lock position toward the lid unlock position without using the drive force of the drive source to permit closing of the lid.

8. The lock device according to claim 1, wherein the power reception connector is installed in a vehicle including a travel motor and a battery that supplies the travel motor with power.

9. A lock device mounted on a vehicle, wherein the vehicle includes a battery, a travel motor powered by the battery, a power reception connector for a power supplying plug that charges the battery, and a lid for closing the power reception connector, the lock device comprising:
    a movable stopper pivotally supported by the power reception connector to engage with and disengage from a power supplying plug connected to the power reception connector;
    a rotating body connected to a drive source and rotated by the drive source in first and second directions from a reference position;

a control shaft coupled to the movable stopper and the rotating body and rotated by the rotating body from a plug unlock position to a plug lock position when the rotating body rotates from the reference position in the first direction, wherein the control shaft is shaped to move the movable stopper to a position at which the movable stopper engages the power supplying plug when the control shaft rotates to the plug lock position; and a lid lock bar coupled to the rotating body and linearly moved by the rotating body from a lid lock position to a lid unlock position against an urging force acting on the lid restriction member when the rotating body rotates from the reference position in the second direction, wherein when the lid is manually operated to close the power reception connector while the lid lock bar is held at the lid lock position, the lid lock bar is urged toward the lid unlock position by the closing lid thereby permitting the lid to close, and the lid lock bar is formed to be returned to the lid lock position by the urging force at a timing at which the lid reaches a close position.

\* \* \* \* \*